US011932035B2

(12) United States Patent
Hasegawa et al.

(10) Patent No.: US 11,932,035 B2
(45) Date of Patent: Mar. 19, 2024

(54) THREE-DIMENSIONAL OBJECT PRINTING APPARATUS

(71) Applicant: Seiko Epson Corporation, Tokyo (JP)

(72) Inventors: Tomonaga Hasegawa, Matsumoto (JP); Yuichiro Matsuura, Chino (JP); Masaru Kumagai, Shiojiri (JP); Shinichi Nakamura, Okaya (JP); Yuki Ishii, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 90 days.

(21) Appl. No.: 17/676,286

(22) Filed: Feb. 21, 2022

(65) Prior Publication Data

US 2022/0266529 A1 Aug. 25, 2022

(30) Foreign Application Priority Data

Feb. 22, 2021 (JP) ................. 2021-025984

(51) Int. Cl.
*G06V 10/141* (2022.01)
*B25J 11/00* (2006.01)
*B41J 3/407* (2006.01)
*G06V 10/56* (2022.01)
*B41J 2/165* (2006.01)

(52) U.S. Cl.
CPC ....... *B41J 3/40731* (2020.08); *B25J 11/0075* (2013.01); *G06V 10/141* (2022.01); *G06V 10/56* (2022.01); *B41J 2/16517* (2013.01)

(58) Field of Classification Search
CPC ............... B41J 3/40731; B41J 11/0075; B41J 2/16517; G06V 10/141; G06V 10/56
See application file for complete search history.

(56) References Cited

U.S. PATENT DOCUMENTS

| 6,398,336 B1 * | 6/2002 | Yoda ............... B41J 2/1652 347/29 |
| 2014/0063096 A1 | 3/2014 | Pitz et al. |
| 2015/0042716 A1 | 2/2015 | Beier et al. |
| 2021/0402686 A1 * | 12/2021 | Kumagai ............ B33Y 50/02 |

FOREIGN PATENT DOCUMENTS

| JP | 2014-050832 A | | 3/2014 |
| JP | 2015-520011 A | | 7/2015 |
| JP | 2017-019183 A | | 1/2017 |
| JP | 2017019183 A | * | 1/2017 |
| JP | 2017-071173 A | | 4/2017 |
| JP | 2020189444 A | * | 11/2020 |

* cited by examiner

*Primary Examiner* — Sharon Polk
(74) *Attorney, Agent, or Firm* — Harness, Dickey & Pierce, P.L.C.

(57) ABSTRACT

There is provided a three-dimensional object printing apparatus including an imaging device fixed to a base and imaging an object located inside an imaging range, a first robot supporting a head having a nozzle for discharging a liquid and changing a position and a posture of the head, and a second robot supporting a three-dimensional workpiece and changes a position and a posture of the workpiece. The three-dimensional object printing apparatus performs a material feeding step of causing the second robot to move the workpiece from an outside to an inside of the imaging range, and a printing step of causing the head to discharge the liquid to the workpiece while at least one of the first robot and the second robot relatively moves the head and the workpiece inside the imaging range.

18 Claims, 15 Drawing Sheets

THREE-DIMENSIONAL OBJECT PRINTING APPARATUS

The present application is based on, and claims priority from JP Application Serial Number 2021-025984, filed Feb. 22, 2021, the disclosure of which is hereby incorporated by reference herein in its entirety.

BACKGROUND

1. Technical Field

The present disclosure relates to a three-dimensional object printing apparatus.

2. Related Art

A three-dimensional object printing apparatus that performs printing on a surface of a three-dimensional workpiece by using an ink jet method is known. For example, JP-A-2017-19183 discloses a printing apparatus that uses an articulated robot to perform printing while changing relative positions of a printing object and a print head.

In the printing apparatus disclosed in JP-A-2017-19183, a position and a posture of the printing object are in a fixed state. Accordingly, depending on a shape of the printing object, a region where the print head cannot be brought closer to the printing object only by operating the articulated robot is likely to exist. Therefore, the printing apparatus disclosed in JP-A-2017-19183 has a problem in that suitable printing cannot be performed on a three-dimensional printing object having various shapes.

SUMMARY

According to an aspect of the present disclosure, there is provided a three-dimensional object printing apparatus that performs printing on a three-dimensional workpiece. The three-dimensional object printing apparatus includes an imaging device fixed to a base and imaging an object located inside an imaging range, a first robot supporting a head having a nozzle for discharging a liquid and changing a position and a posture of the head, and a second robot supporting the workpiece and changing a position and a posture of the workpiece. The three-dimensional object printing apparatus performs a material feeding step of causing the second robot to move the workpiece from an outside to an inside of the imaging range, and a printing step of causing the head to discharge the liquid to the workpiece while at least one of the first robot and the second robot relatively moves the head and the workpiece inside the imaging range.

DESCRIPTION OF EXEMPLARY EMBODIMENTS

Figure 1:
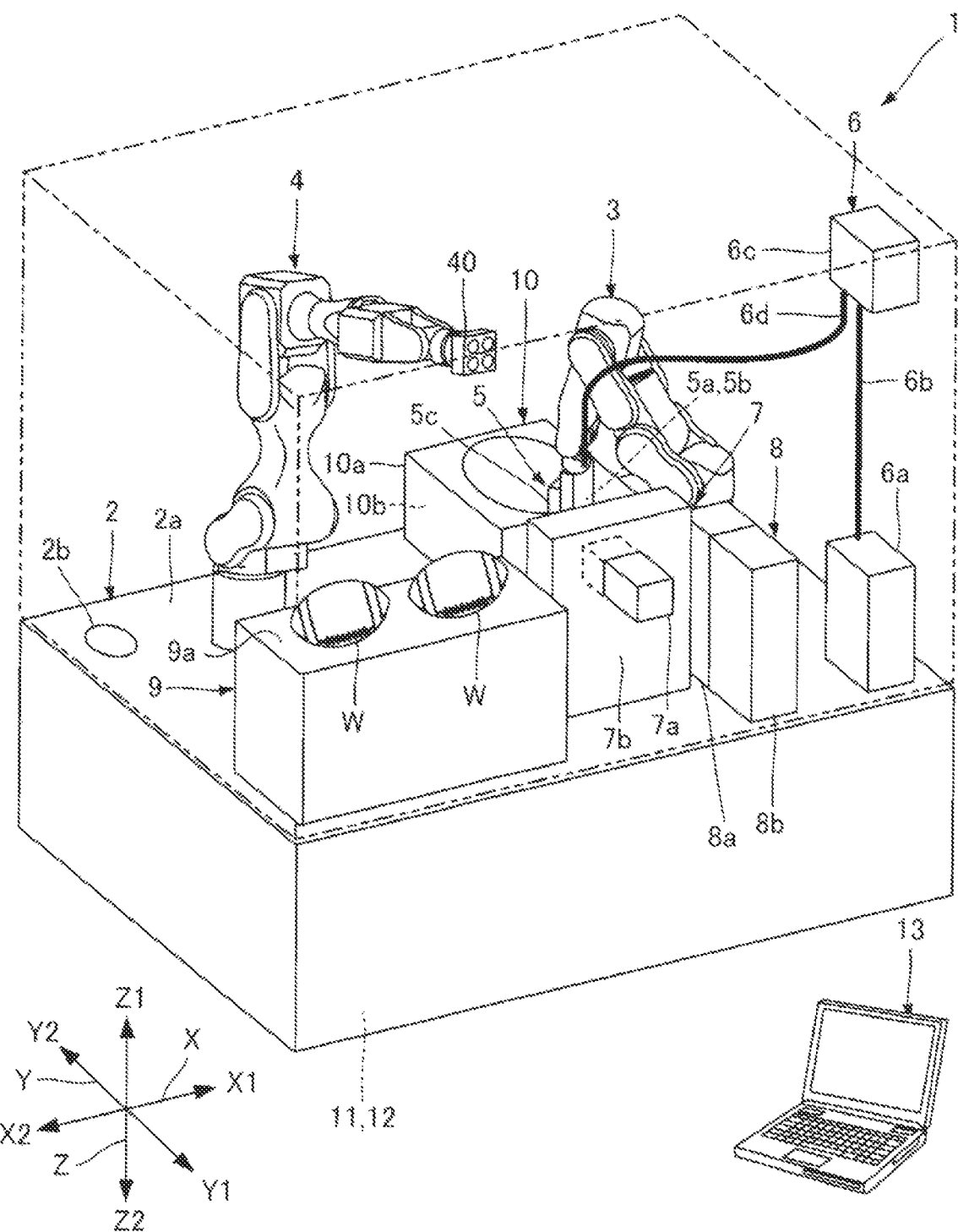
FIG. 1 is a perspective view illustrating an outline of a three-dimensional object printing apparatus according to a first embodiment.

Hereinafter, preferred embodiments according to the present disclosure will be described with reference to the accompanying drawings. In the drawings, dimensions or scales of respective parts are appropriately different from actual ones, and some portions are schematically illustrated to facilitate understanding. In addition, the scope of the present disclosure is not limited to the forms unless the present disclosure is particularly limited in the following description.

The following description will be given by appropriately using an X-axis, a Y-axis, and a Z-axis which intersect each other. In addition, one direction along the X-axis will be referred to as an X1-direction, and a direction opposite to the X1-direction will be referred to as an X2-direction. Similarly, directions opposite to each other along the Y-axis are referred to as a Y1-direction and a Y2-direction. In addition, the directions opposite to each other along the Z-axis will be referred to as a Z1-direction and a Z2-direction.

Here, the X-axis, the Y-axis, and the Z-axis are coordinate axes of a world coordinate system set in a space where a first robot 3 and a second robot 4 (to be described later) are installed. Typically, the Z-axis is a vertical axis, and the Z2-direction corresponds to a downward direction in the vertical direction. A base coordinate system based on each base portion of the first robot 3 and the second robot 4 is associated with the world coordinate system by calibration. Hereinafter, for convenience, a case where the world coordinate system is used as a robot coordinate system to control each operation of the first robot 3 and the second robot 4 will be described as an example.

The Z-axis may not be the vertical axis. In addition, the X-axis, the Y-axis, and the Z-axis are typically perpendicular to each other. However, without being limited thereto, the X-axis, the Y-axis, and the Z-axis may not be perpendicular to each other in some cases. For example, the X-axis, Y-axis, and Z-axis may intersect each other at an angle within a range of 80° or larger and 100° or smaller.

1. First Embodiment

1-1. Outline of Three-Dimensional Object Printing Apparatus

FIG. 1 is a perspective view illustrating an outline of a three-dimensional object printing apparatus 1 according to a first embodiment. The three-dimensional object printing apparatus 1 uses an ink jet method to perform printing on a surface of a three-dimensional workpiece W by using the first robot 3 and the second robot 4.

In an example illustrated in FIG. 1, the workpiece W is a rugby ball having a long spherical shape. An aspect such as a shape or a size of the workpiece W is not limited to the example illustrated in FIG. 1, and is selected in any desired way.

As illustrated in FIG. 1, the three-dimensional object printing apparatus 1 includes a base 2, the first robot 3, the second robot 4, a liquid discharge unit 5, an ink supply unit 6, an imaging unit 7, and a maintenance unit 8, a mounting unit 9, a curing unit 10, a controller 11, a control module 12, and a computer 13. Hereinafter, first, each part of the three-dimensional object printing apparatus 1 illustrated in FIG. 1 will sequentially and briefly be described.

The base 2 has a surface 2a that supports the first robot 3 and the second robot 4. The surface 2a faces the Z1-direction. In the present embodiment, in addition to the first robot 3 and the second robot 4, the surface 2a supports the ink supply unit 6, the imaging unit 7, the maintenance unit 8, the mounting unit 9, and the curing unit 10. Here, each of the first robot 3, the second robot 4, the ink supply unit 6, the imaging unit 7, the maintenance unit 8, the mounting unit 9, and the curing unit 10 is directly fixed to the base 2 by screwing or is indirectly fixed via another member.

In the example illustrated in FIG. 1, the base 2 has a box shape, and the controller 11 and the control module 12 are accommodated inside the base 2. In addition, an exhaust port 2b is provided on the surface 2a of the base 2. An exhaust mechanism (not illustrated) is coupled to the exhaust port 2b. The exhaust mechanism suctions gas on the surface 2a from the exhaust port 2b, and discharges the suctioned gas to the outside after treatment such as purification treatment.

Although detailed illustration is omitted, a case 20 is disposed at a position in the Z1-direction with respect to the base 2, as illustrated by a two-dot chain line in FIG. 1. The case 20 is a structure body that forms a space for accommodating structures such as the first robot 3 and the second robot 4 which are supported by the base 2 with the surface 2a. For example, the case 20 has a plurality of pillars and beams which are formed of metal, and a plurality of plate materials such as a top plate and a wall plate which are formed of a transparent material such as acrylic resin. In addition, the case 20 is provided with a window for supplying and unloading the workpiece W to and from the mounting unit 9.

A configuration of the base 2 is not limited to the example illustrated in FIG. 1, and is selected in any desired way. In addition, the base 2 may be provided when necessary, or may be omitted. In this case, each configuration element of the three-dimensional object printing apparatus 1 is installed on a floor, a wall, or a ceiling of a building, for example. In other words, the base 2 may not be the configuration element of the three-dimensional object printing apparatus 1, and may be the floor, the wall, or the ceiling of the building, for example. In the present embodiment, each configuration element except for the base 2 of the three-dimensional object printing apparatus 1 is supported on the surface 2a which is the same plane, but each configuration element may be supported on a surface which faces mutually different directions. For example, the first robot 3 may be installed on one of the floor, the wall, and the ceiling, and the second robot 4 may be installed on the other one. In addition, the first robot 3 may be installed on one of the plurality of walls facing mutually different directions, and the second robot 4 may be installed on the other wall.

The first robot 3 changes a position and a posture of the liquid discharge unit 5 in the world coordinate system. In the example illustrated in FIG. 1, the first robot 3 is a so-called 6-axis vertical articulated robot, and the liquid discharge unit 5 serving as an end effector is mounted on a tip of an arm of the first robot 3 in a state of being fixed by screwing. A configuration of the first robot 3 will be described later with reference to FIG. 3.

The liquid discharge unit 5 is a device having a head 5a that discharges an ink which is an example of a "liquid" toward the workpiece W. In the present embodiment, in addition to the head 5a, the liquid discharge unit 5 has a pressure regulating valve 5b and a temporary curing light source 5c. A configuration of the liquid discharge unit 5 will be described later with reference to FIG. 4.

The ink is not particularly limited. For example, examples of the ink include an aqueous ink in which a coloring material such as a dye or a pigment is dissolved in an aqueous solvent, a curable ink using a curable resin having an ultraviolet curable type, and a solvent-based ink in which a coloring material such as a dye or a pigment is dissolved in an organic solvent. Out of the inks, the curable ink is preferably used. The curable ink is not particularly limited. For example, any one of a thermosetting type, a photocurable type, a radiation curable type, and an electron beam curable type may be used. However, the photocurable type such as an ultraviolet curable type is preferably used. The ink is not limited to the solution, and may be an ink in which a coloring material is dispersed as a dispersoid in a dispersion medium. In addition, the ink is not limited to an ink containing the coloring material. For example, the ink may be an ink containing a conductive particle such as a metal particle for forming wiring as a dispersoid, may be a clear ink, or may be a treatment liquid for performing surface treatment of the workpiece W.

On the other hand, the second robot 4 changes the position and the posture of the workpiece W in the world coordinate system. In the example illustrated in FIG. 1, the second robot 4 is a 6-axis vertical articulated robot, and a hand mechanism 40 serving as an end effector is mounted on a tip of an arm of the second robot 4 in a state of being fixed by screwing.

The second robot 4 is configured in the same manner as the first robot 3 except that the end effector to be mounted is different. However, the first robot 3 and the second robot 4 may have mutually different configurations, and in the present embodiment, configurations such as an arm length and load capacity are different from each other when necessary. In addition, the number of joints of the first robot 3 and the second robot 4 may be different from each other.

The hand mechanism 40 is a robot hand that holds the workpiece W to be attachable and detachable. Here, "holding" is a concept including both suctioning and gripping. In the example illustrated in FIG. 1, the hand mechanism 40 suctions the workpiece W by using a negative pressure. A configuration of the hand mechanism 40 is appropriately determined depending on a shape, a size, and a material, of the workpiece W. The hand mechanism 40 is not limited to a suction mechanism using the negative pressure. For example, the hand mechanism 40 may be a suction mechanism using a magnetic force, or a gripping hand mechanism having a plurality of fingers or claws.

The ink supply unit 6 is a mechanism for supplying the ink to the liquid discharge unit 5. In the example illustrated in FIG. 1, the ink supply unit 6 has an ink tank 6a, a supply pipe 6b, a sub tank 6c, and a supply pipe 6d. The ink tank 6a is a container for storing the ink, and is formed of a flexible film, for example. The supply pipe 6b is a pipe body that couples the ink tank 6a and the sub tank 6c, and is formed of a rubber material or an elastomer material, for example. The sub tank 6c is a container for storing the ink supplied from the ink tank 6a via the supply pipe 6b, and is formed of a resin material or a metal material, for example. For example, the ink can be supplied from the ink tank 6a to the sub tank 6c by a pump (not illustrated) provided in an intermediate portion of the supply pipe 6b. The supply pipe 6d is a pipe body that couples the sub tank 6c and the liquid discharge unit 5, and is formed of a rubber material or an elastomer material, for example. Since the supply pipe 6d is flexible, the position and the posture of the liquid discharge unit 5 are allowed to be changed.

Here, the sub tank 6c is fixed to the case 20 to be located above a movement region of the liquid discharge unit 5 in a vertical direction. Therefore, the sub tank 6c is always located in the Z1-direction of the liquid discharge unit 5. Accordingly, the ink can be supplied from the sub tank 6c to the liquid discharge unit 5 with a predetermined pressing force without using a mechanism such as a pump. The sub tank 6c may be omitted. In this case, for example, the ink from the ink tank 6a may be supplied to the liquid discharge unit 5 at a predetermined pressure by using the pump.

The imaging unit 7 is a device for detecting the position and the posture of the workpiece W. The imaging unit 7 has an imaging device 7a and an illumination unit 7b. The imaging device 7a is generally called a vision sensor, is a camera including an imaging optical system and an imaging element, and images an object located inside an imaging range. The imaging optical system includes at least one imaging lens, and may include various optical elements such as a prism, or may include a zoom lens or a focus lens. For example, the imaging element is a charge coupled device (CCD) image sensor or a complementary MOS (CMOS) image sensor. In the imaging device 7a, a two-axis or three-axis imaging coordinate system is set based on any desired point of a captured image. The imaging coordinate system is associated with the base coordinate system or the world coordinate system described above by calibration. The illumination unit 7b is a light source including a light emitting element such as a light emitting diode (LED), and emits the light toward the imaging range of the imaging device 7a. When the workpiece W is imaged as the object by using illumination of the illumination unit 7b, contrast of the image captured by the imaging device 7a can be improved. As a result, it is possible to improve accuracy in detecting the position and the posture of the workpiece W, based on an imaging result of the imaging device 7a. The illumination unit 7b is appropriately provided with an optical configuration element such as a lens or a reflector for adjusting an emission direction or an emission range of the light. The emission direction of the light from the illumination unit 7b is the Y1-direction, and the light emitted from the illumination unit 7b is diffused in an X-direction and a Z-direction from the illumination unit 7b toward the Y1-direction.

The maintenance unit 8 is a mechanism for performing maintenance of the head 5a of the liquid discharge unit 5. In the example illustrated in FIG. 1, the maintenance unit 8 is divided into a unit 8a and a unit 8b. Although not illustrated, the unit 8a has a cap, a wiper, and a suction mechanism. The cap is formed of an elastic member such as rubber, and covers a nozzle and a nozzle surface of the head 5a (to be described later), thereby preventing the ink in the vicinity of the nozzle of the head 5a from being dried. In addition, when the ink is a photocurable type, the cap covers the nozzle surface of the head 5a to block external light, thereby preventing thickening or solidification of the ink in the vicinity of the nozzle of the head 5a. The wiper cleans the nozzle surface by wiping the nozzle surface of the head 5a. The suction mechanism refreshes the ink inside the nozzle by suctioning the ink from the nozzle of the head 5a in a state where the nozzle surface is covered by the cap. The unit 8b is a mechanism for inspecting an ink discharge function of the head 5a. For example, the unit 8b supports a medium such as a sheet or a film for printing a pattern for inspection. A configuration of the maintenance unit 8 is not limited to the above-described configuration, and the unit 8b may be omitted, for example.

The mounting unit 9 is a table having a surface 9a on which the workpiece W is mounted to feed and remove a material. The mounting unit 9 is disposed at a position where the workpiece W can be supplied from and unloaded to the outside of the case 20. In the example illustrated in FIG. 1, two workpieces W can be mounted on the surface 9a. A plurality of the workpieces W can be mounted on the surface 9a in this way. Accordingly, the workpiece W for subsequent printing can be mounted on the surface 9a in a state where a region for unloading the workpiece W is vacant during printing. Although not illustrated, the surface 9a appropriately has a shape of a concave portion or a convex portion for stabilizing the position and the posture of the workpiece W to be mounted. A configuration of the mounting unit 9 is not limited to the example illustrated in FIG. 1, and is selected in any desired way.

The curing unit 10 is a mechanism for curing or solidifying the ink on the workpiece W. In the example illustrated in FIG. 1, the curing unit 10 has a light-blocking member 10a and a light source 10b. The light-blocking member 10a is a box-shaped light-blocking member that is open in the Z1-direction so that the workpiece W can enter, and is formed of a resin material or a metal material, for example. The light source 10b is disposed inside the light-blocking member 10a. The light source 10b emits energy such as the light, heat, an electron beam, or radiation for curing or solidifying the ink. For example, when the ink is an ultraviolet curable type, the energy is an ultraviolet ray, and is formed of a light emitting element such as a light emitting diode (LED) that emits the ultraviolet ray. The light source 10b may have an optical configuration element such as a lens for adjusting an emission direction or an emission range of the energy. In addition, in addition to the light source 10b, a mirror for reflecting the light from the light source 10b may be provided inside the light-blocking member 10a.

The controller 11 is a robot controller that controls drive of the first robot 3 and the second robot 4. The control module 12 is a circuit module that is coupled to the controller 11 to be communicable, and controls the liquid discharge unit 5. The computer 13 is coupled to the controller 11 and the control module 12 to be communicable. In the example illustrated in FIG. 1, the computer 13 is a notebook type. However, without being limited thereto, for example, the computer 13 may be a desktop type. Hereinafter, an electrical configuration of the three-dimensional object printing apparatus 1 will be described with reference to FIG. 2.

Figure 2:
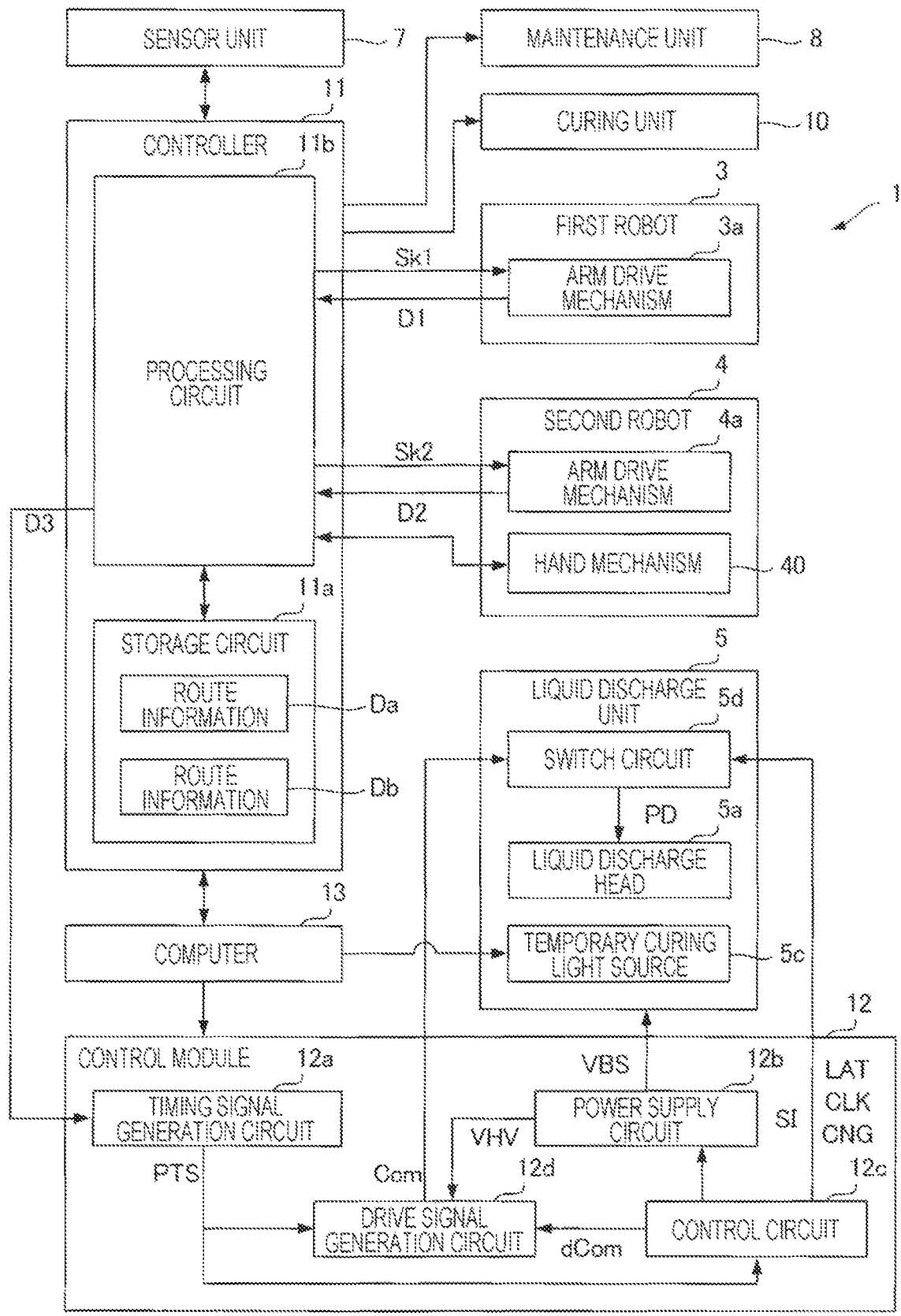
FIG. 2 is a block diagram illustrating an electrical configuration of the three-dimensional object printing apparatus according to the first embodiment.

1-2. Electrical Configuration of Three-Dimensional Object Printing Apparatus FIG. 2 is a block diagram illustrating the electrical configuration of the three-dimensional object printing apparatus 1 according to the first embodiment. FIG. 2 illustrates electrical configuration elements out of the configuration elements of the three-dimensional object printing apparatus 1. In addition, each of the electrical configuration elements illustrated in FIG. 1 may appropriately be divided, some may be included in another configuration element, or may be formed integrally with another configuration element. For example, functions of the controller 11 or the control module 12 may partially or entirely be realized by the computer 13, or may be realized by other external devices such as a personal computer (PC) coupled to the controller 11 via a network such as a local area network (LAN) or the Internet.

The controller 11 has a function of controlling the drive of the first robot 3 and the second robot 4, and a function of generating a signal D3 for synchronizing an ink discharge operation of the liquid discharge unit 5 with an operation of the first robot 3. The controller 11 has a storage circuit 11a and a processing circuit 11b.

The storage circuit 11a stores various programs executed by the processing circuit 11b and various data processed by the processing circuit 11b. For example, the storage circuit 11a includes one or both semiconductor memories of a volatile memory such as a random access memory (RAM) and a non-volatile memory such as a read only memory (ROM), an electrically erasable programmable read-only memory (EEPROM) or a programmable ROM (PROM). The storage circuit 11a may partially or entirely be included in the processing circuit 11b.

The storage circuit 11a stores route information Da and route information Db. The route information Da indicates a movement route of the liquid discharge unit 5 and a posture of the liquid discharge unit 5 in the route. The route information Db indicates a movement route of the hand mechanism 40 and a posture of the hand mechanism 40 in the route. For example, each information is represented by using a coordinate value of the base coordinate system or the world coordinate system. In addition, each information is determined, based on a shape of the workpiece W. For example, the shape of the workpiece W can be obtained from computer-aided design (CAD) data indicating a three-dimensional shape of the workpiece W.

Here, the route information Db includes information relating to the position and the posture of the workpiece W during the printing. In addition, the route information Da includes information relating to the position and the posture of the liquid discharge unit 5 during the printing. The position and the posture of the liquid discharge unit 5 during the printing are determined, based on information such as CAD data of the workpiece W and the position and the posture of the workpiece W during the printing. Each of the route information Da and the route information Db which are described above is input to the storage circuit 11a from the computer 13.

The processing circuit 11b controls an operation of the arm drive mechanism 3a of the first robot 3, based on the route information Da, and generates the signal D3. In addition, the processing circuit 11b controls an operation of the arm drive mechanism 4a of the second robot 4, based on the route information Db. Here, the processing circuit 11b corrects an operation of at least one of the arm drive mechanism 3a and the arm drive mechanism 4a during the printing, based on an imaging result of the imaging unit 7. In the present embodiment, the processing circuit 11b corrects the operation of the arm drive mechanism 4a during the printing, based on the imaging result of the imaging unit 7. For example, the processing circuit 11b includes one or more processors such as a central processing unit (CPU). The processing circuit 11b may include a programmable logic device such as a field-programmable gate array (FPGA) instead of the CPU or in addition to the CPU.

The arm drive mechanism 3a includes a motor for driving each joint of the first robot 3 and an encoder for detecting a rotation angle of each joint of the first robot 3. Similarly, the arm drive mechanism 4a has a motor for driving each joint of the second robot 4 and an encoder for detecting a rotation angle of each joint of the second robot 4.

The processing circuit 11b performs inverse kinematics calculation which is calculation for converting the route information Da into an operation amount such as a rotation angle and a rotation speed of each joint of the first robot 3. Then, the processing circuit 11b outputs a control signal Sk1 so that an operation amount such as an actual rotation angle and an actual rotation speed of each joint becomes the above-described calculation result, based on an output D1 from each encoder of the arm drive mechanism 3a. The control signal Sk1 controls the drive of the motor of the arm drive mechanism 3a.

Similarly, the processing circuit 11b performs inverse kinematics calculation which is calculation for converting the route information Db into an operation amount such as the rotation angle and the rotation speed of each joint of the second robot 4. Then, the processing circuit 11b outputs a control signal Sk2 so that an operation amount such as an actual rotation angle and an actual rotation speed of each joint becomes the above-described calculation result, based on an output D2 from each encoder of the arm drive mechanism 4a. The control signal Sk2 controls the drive of the motor of the arm drive mechanism 4a.

Here, the processing circuit 11b detects the position and the posture of the workpiece W during the printing, based on the imaging result of the imaging device 7a of the imaging unit 7. Then, the processing circuit 11b corrects the control signal Sk2 during the printing so that a difference between the detection result and the position and the posture which are indicated by the route information Db is reduced, based on a detection result thereof and the route information Db. For example, the position and the posture of the workpiece W can be obtained by converting the position and the posture of the workpiece W inside the captured image of the imaging device 7a from the imaging coordinate system to the world coordinate system. In addition, for example, the position and the posture of the workpiece W in the imaging coordinate system are calculated, based on the position of a feature point of the workpiece W inside the captured image and shape information of the workpiece W. The position and the posture of the workpiece W based on the imaging result of the imaging device 7a may be detected by an image processing circuit included in the imaging device 7a, or may be detected by the computer 13.

In addition, the processing circuit 11b generates a signal D3, based on the output D1 from at least one of the plurality of encoders of the arm drive mechanism 3a. For example, as the signal D3, the processing circuit 11b generates a trigger signal including a pulse at a timing at which the output D1 from one of the plurality of encoders has a predetermined value.

The control module 12 is a circuit that controls an ink discharge operation in the liquid discharge unit 5, based on the signal D3 output from the controller 11 and print data from the computer 13. The control module 12 has a timing signal generation circuit 12a, a power supply circuit 12b, a control circuit 12c, and a drive signal generation circuit 12d.

The timing signal generation circuit 12a generates a timing signal PTS, based on the signal D3. For example, the timing signal generation circuit 12a is configured to include a timer that starts generation of the timing signal PTS when the signal D3 is detected.

The power supply circuit 12b receives power supplied from a commercial power source (not illustrated), and generates various predetermined potentials. The various generated electric potentials are appropriately supplied to each portion of the control module 12 and the liquid discharge unit 5. For example, the power supply circuit 12b generates a power supply potential VHV and an offset potential VBS. The offset potential VBS is supplied to the liquid discharge unit 5. In addition, the power supply potential VHV is supplied to the drive signal generation circuit 12d.

The control circuit 12c generates a control signal SI, a waveform designation signal dCom, a latch signal LAT, a clock signal CLK, and a change signal CNG, based on the timing signal PTS. The signals are synchronized with the timing signal PTS. Out of the signals, the waveform designation signal dCom is input to the drive signal generation circuit 12d, and the other signals are input to the switch circuit 5d of the liquid discharge unit 5.

The control signal SI is a digital signal for designating an operation state of a drive element included in the head 5a of the liquid discharge unit 5. Specifically, the control signal SI designates whether or not to supply a drive signal Com (to be described later) to the drive element. Through this designation, for example, whether or not to discharge the ink from the nozzle corresponding to the drive element is designated, or the amount of the ink discharged from the nozzle is designated. The waveform designation signal dCom is a digital signal for defining a waveform of the drive signal Com. The latch signal LAT and the change signal CNG are used in combination with the control signal SI, and define a drive timing of the drive element to define a discharge timing of the ink from the nozzle. The clock signal CLK is a reference clock signal synchronized with the timing signal PTS.

For example, the above-described control circuit 12c includes one or more processors such as a central processing unit (CPU). The control circuit 12c may include a programmable logic device such as a field-programmable gate array (FPGA) instead of the CPU or in addition to the CPU.

The drive signal generation circuit 12d generates the drive signal Com for driving each drive element included in the head 5a of the liquid discharge unit 5. Specifically, for example, the drive signal generation circuit 12d includes a DA conversion circuit and an amplifier circuit. In the drive signal generation circuit 12d, the DA conversion circuit converts the waveform designation signal dCom supplied from the control circuit 12c from a digital signal to an analog signal. The amplifier circuit uses the power supply potential VHV supplied from the power supply circuit 12b, and amplifies the analog signal, thereby generating the drive signal Com. Here, out of the waveforms included in the drive signal Com, a signal having a waveform actually supplied to the drive element is a drive pulse PD. The drive pulse PD is supplied to the drive element from the drive signal generation circuit 12d via the switch circuit 5d of the liquid discharge unit 5. The switch circuit 5d switches whether or not to supply at least a portion of the waveform included in the drive signal Com as the drive pulse PD, based on the control signal SI.

The computer 13 has a function of supplying information such as the route information Da and the route information Db to the controller 11 and a function of supplying information such as print data to the control module 12. The imaging device 7a described above may be coupled to the controller 11 via the computer 13. In this case, the computer 13 may input an imaging result of the imaging device 7a to the controller 11 without any change, may calculate the position and the posture of the workpiece W, based on the imaging result of the imaging device 7a, or may input information indicating the calculation result to the controller 11.

1-3. Configuration of First Robot

Figure 3:
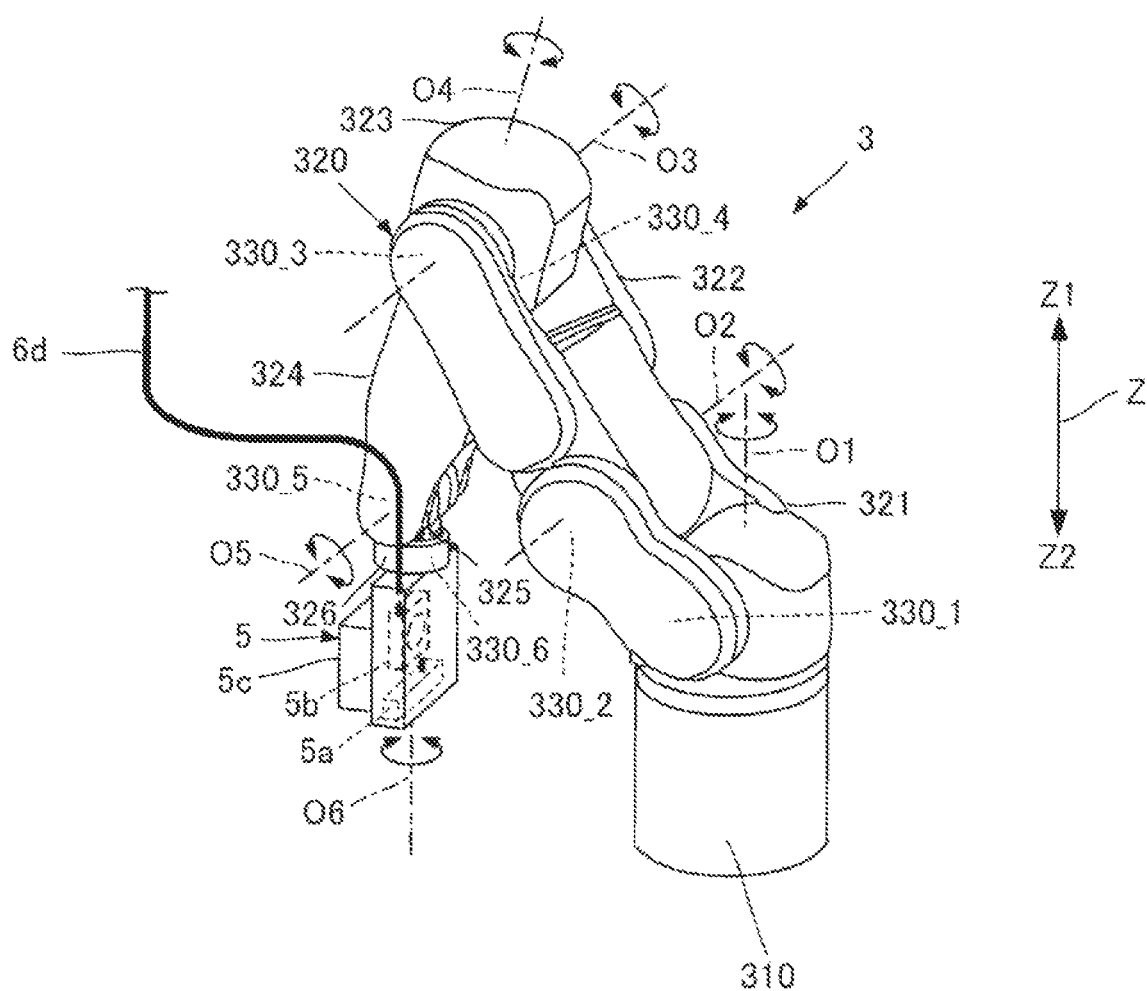
FIG. 3 is a perspective view of a first robot.

FIG. 3 is a perspective view of the first robot 3. Hereinafter, a configuration of the first robot 3 will be described. A configuration of the second robot 4 is the same as that of the first robot 3 except that the end effectors to be mounted are different from each other, and thus, description thereof will be omitted. However, as described above, the configurations of the first robot 3 and the second robot 4 may be different from each other, and this point will appropriately be described (refer to 1-5).

As illustrated in FIG. 3, the first robot 3 has a base portion 310 which is an example of a "first base portion" and an arm 320.

The base portion 310 is a base that supports the arm 320. In the example illustrated in FIG. 3, the base portion 310 is attached to the surface 2a of the base 2 in the Z-direction, and is fixed by screwing.

The arm 320 is a 6-axis robot arm having a base end attached to the base portion 310 and a tip for changing a three-dimensional position and posture with respect to the base end. Specifically, the arm 320 has arms 321, 322, 323, 324, 325, and 326, and the arms are coupled in this order.

The arm 321 is coupled to the base portion 310 to be pivotable around a pivoting axis O1 via a joint portion 330_1. The arm 322 is coupled to the arm 321 to be pivotable around a pivoting axis O2 via a joint portion 330_2. The arm 323 is coupled to the arm 322 to be pivotable around a pivoting axis O3 via a joint portion 330_3. The arm 324 is coupled to the arm 323 to be pivotable around a pivoting axis O4 via a joint portion 330_4. The arm 325 is coupled to the arm 324 to be pivotable around a pivoting axis O5 via a joint portion 330_5. The arm 326 is coupled to the arm 325 to be pivotable around a pivoting axis O6 via a joint portion 330_6.

Each of the joint portions 330_1 to 330_6 is a mechanism for coupling one of two adjacent members of the base portion 310 and the arms 321 to 326 to the other to be pivotable. Although not illustrated in FIG. 3, each of the joint portions 330_1 to 330_6 is provided with a drive mechanism for causing one of the two adjacent members to pivot with respect to the other. For example, the drive mechanism has a motor that generates a driving force for the pivoting, a speed reducer that decelerates and outputs the driving force, and an encoder such as a rotary encoder that detects an operation amount such as an angle of the pivoting. An aggregate of the drive mechanisms of the joint portions 330_1 to 330_6 corresponds to the arm drive mechanism 3a illustrated in FIG. 2 described above.

The pivoting axis O1 is perpendicular to the surface 2a to which the base portion 310 is fixed. The pivoting axis O2 is perpendicular to the pivoting axis O1. The pivoting axis O3 is parallel to the pivoting axis O2. The pivoting axis O4 is perpendicular to the pivoting axis O3. The pivoting axis O5 is perpendicular to the pivoting axis O4. The pivoting axis O6 is perpendicular to the pivoting axis O5.

With regard to the pivoting axes, the term "vertical" includes not only a case where an angle formed by the two pivoting axes is strictly 90°, but also a case where the angle formed by the two pivoting axes deviates within a range of approximately 90°±5°. Similarly, the term "parallel" includes not only a case where the two pivoting axes are strictly parallel to each other, but also a case where one of the two pivoting axes is tilted within a range of approximately ±5° with respect to the other.

As an end effector, the liquid discharge unit 5 is mounted on an arm located on a most tip of the above-described arm 320, that is, the arm 326.

1-4. Configuration of Liquid Discharge Unit

Figure 4:
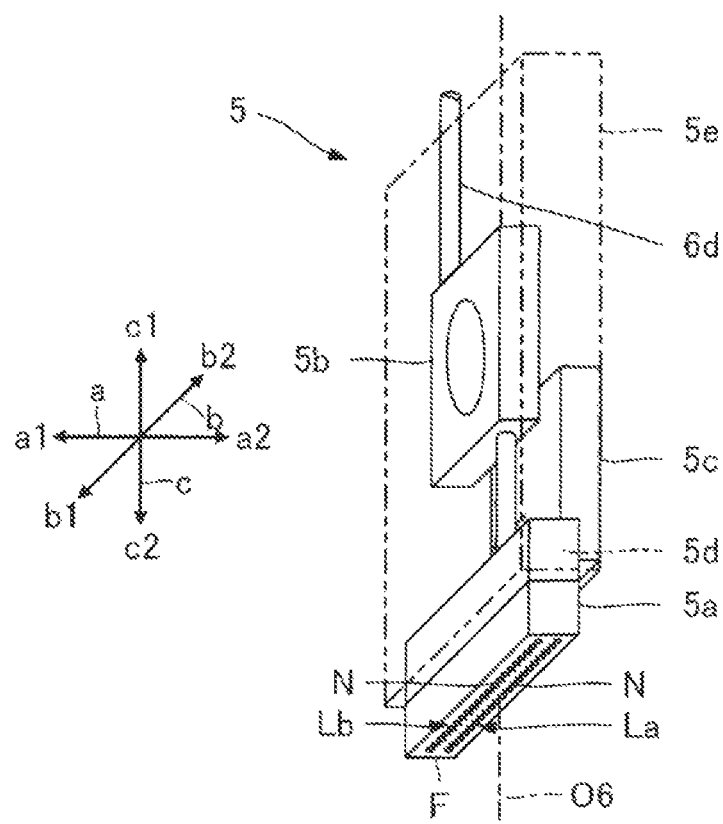
FIG. 4 is a perspective view illustrating a schematic configuration of a liquid discharge unit.

FIG. 4 is a perspective view illustrating a schematic configuration of the liquid discharge unit 5. In the following description, an a-axis, a b-axis, and a c-axis which intersect each other are appropriately used. In addition, one direction along the a-axis will be referred to as a1-direction, and a direction opposite to the a1-direction will be referred to as an a2-direction. Similarly, directions opposite to each other along the b-axis will be referred to as a b1-direction and a b2-direction. In addition, directions opposite to each other along the c-axis will be referred to as a c1-direction and a c2-direction.

Here, the a-axis, the b-axis, and the c-axis are coordinate axes of a tool coordinate system set in the liquid discharge unit 5, and a relationship of relative positions and postures of the X-axis, the Y-axis, and the Z-axis is changed by the operation of the above-described first robot 3. In the example illustrated in FIG. 4, the c-axis is parallel to the above-described pivoting axis O6. The a-axis, b-axis, and c-axis are typically perpendicular to each other. However, without being limited thereto, the axes may intersect each other at an angle within a range of 80° or larger and 100° or smaller, for example. The tool coordinate system and the above-described base coordinate system are associated with each other by calibration. In addition, for example, the tool coordinate system is set so that a center of a nozzle surface F (to be described later) serves as a reference (tool center point).

As described above, the liquid discharge unit 5 has the head 5a, the pressure regulating valve 5b, and the temporary curing light source 5c. These are supported by a support body 5e indicated by a two-dot chain line in FIG. 4. In the example illustrated in FIG. 4, the number of the heads 5a and the pressure regulating valves 5b which are included in the liquid discharge unit 5 is one. However, without being limited to the example illustrated in FIG. 4, the number may be two or more. In addition, an installation position of the pressure regulating valve 5b is not limited to the arm 326. For example, installation position may be another arm, or may be a fixed position with respect to the base portion 310.

For example, the support body 5e is formed of a metal material, and is a substantially rigid body. In FIG. 4, the support body 5e has a flat box shape. However, without being particularly limited, the shape of the support body 5e may be selected in any desired way.

The above-described support body 5e is attached to the above-described arm 326. In this way, the head 5a, the pressure regulating valve 5b, and the temporary curing light source 5c are collectively supported in the arm 326 by the support body 5e. Therefore, each relative position of the head 5a, the pressure regulating valve 5b, and the temporary curing light source 5c is fixed with respect to the arm 326.

The head 5a has the nozzle surface F and a plurality of nozzles N which are open on the nozzle surface F. In the example illustrated in FIG. 4, a normal direction of the nozzle surface F is the c2-direction, and the plurality of nozzles N are divided into a first nozzle row La and a second nozzle row Lb which are aligned at an interval along the a-axis. Each of the first nozzle row La and the second nozzle row Lb is a set of the plurality of nozzles N linearly arranged in the direction along the b-axis. Here, elements relating to each of the nozzles N of the first nozzle row La and the element relating to each of the nozzles N of the second nozzle row Lb in the head 5a are configured to be substantially symmetrical with each other in the direction along the a-axis.

However, the positions of the plurality of nozzles N in the first nozzle row La and the plurality of nozzles N in the second nozzle row Lb in the direction along the b-axis may coincide with each other, or may be different from each other. In addition, the element relating to each of the nozzles N of one of the first nozzle row La and the second nozzle row Lb may be omitted. Hereinafter, a configuration in which the positions of the plurality of nozzles N in the first nozzle row La and the plurality of nozzles N in the second nozzle row Lb in the direction along the b-axis coincide with each other will be described as an example.

Although not illustrated, in the head 5a, every nozzle N has a piezoelectric element serving as a drive element and a cavity for accommodating the ink. Here, the piezoelectric element discharges the ink from the nozzle corresponding to the cavity by changing a pressure of the cavity corresponding to the piezoelectric element. For example, the head 5a can be obtained by bonding a plurality of substrates such as silicon substrates appropriately processed by etching with an adhesive. As the drive element for discharging the ink from the nozzle, a heater that heats the ink inside the cavity may be used instead of the piezoelectric element.

In the example illustrated in FIG. 4, the pressure regulating valve 5b is located in the c1-direction with respect to the head 5a. The temporary curing light source 5c is located in the a2-direction with respect to the head 5a.

The pressure regulating valve 5b is coupled to the sub tank 6c via the supply pipe 6d of the above-described ink supply unit 6. The pressure regulating valve 5b is a valve mechanism that is opened and closed in response to a pressure of the ink inside the head 5a. The opening and closing maintain the pressure of the ink inside the head 5a at a negative pressure within a predetermined range, even when a positional relationship between the head 5a and the sub tank 6c is changed. Therefore, meniscus of the ink formed in the nozzle N of the head 5a is stabilized. As a result, it is possible to prevent air bubbles from entering the nozzle N or to prevent the ink from overflowing from the nozzle N. The ink from the pressure regulating valve 5b is appropriately distributed to a plurality of locations of the head 5a via a branch flow path (not illustrated).

The temporary curing light source 5c emits energy such as light, heat, an electron beam, or radiation for semi-curing or semi-solidifying of the ink on the workpiece W. The term "semi-curing" means a state where the ink is partially cured without being completely cured. Similarly, the term "semi-solidifying" means a state where the ink is partially solidified without being completely solidified. As in the light source 10b of the above-described curing unit 10, for example, the temporary curing light source 5c is configured to include a light emitting element such as a light emitting diode (LED) that emits an ultraviolet ray. The temporary curing light source 5c may have an optical component such as a lens for adjusting an emission direction or an emission range of the energy. The temporary curing light source 5c may be provided when necessary, or may be omitted. In addition, the ink on the workpiece W may completely be cured by using the temporary curing light source 5c.

1-5. Disposition of Curing Unit and Maintenance Unit

Figure 5:
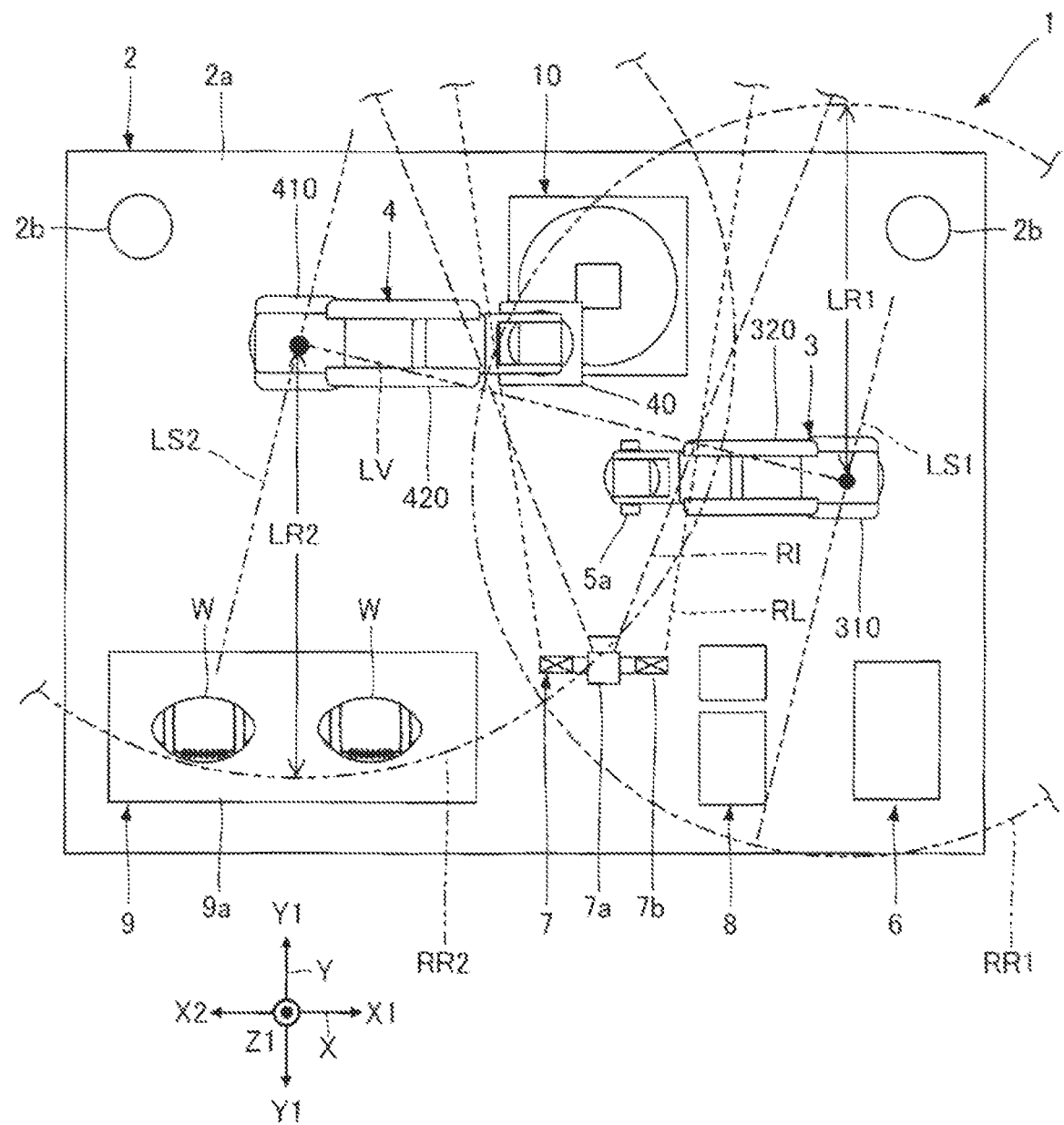
FIG. 5 is a plan view of the three-dimensional object printing apparatus according to the first embodiment.

FIG. 5 is a plan view of the three-dimensional object printing apparatus 1 according to the first embodiment. FIG. 5 illustrates the three-dimensional object printing apparatus 1 when viewed in the Z2-direction.

As described above, the first robot 3 has the base portion 310 which is an example of the "first base portion" fixed to the base 2 and the arm 320. The head 5a is attached to the tip of the arm 320. On the other hand, as illustrated in FIG. 5, the second robot 4 has the base portion 410 which is an example of the "second base portion" fixed to the base 2 and the arm 420. The hand mechanism 40 that supports the workpiece W is attached to the tip of the arm 420. As in the base portion 310, the base portion 410 is attached to the surface 2a of the base 2 in the Z-direction, and is fixed by screwing.

In a plan view of the base 2, positions of the base portion 310 and the base portion 410 in the direction along the X-axis are different from each other, and the base portion 310 is located in the X1-direction with respect to the base portion 410. Therefore, in a plan view of the base 2, a virtual line segment LV connecting the base portion 310 and the base portion 410 mainly extends along the X-axis. In a plan view of the base 2, the virtual line segment LV may connect any desired position of the base portion 310 and any desired position of the base portion 410. In the example illustrated in FIG. 5, the virtual line segment LV passes through a first axis which is the pivoting axis of the joint closest to the base 2 of each of the first robot 3 and the second robot 4.

However, in the example illustrated in FIG. 5, the positions of the base portion 310 and the base portion 410 along the Y-axis are slightly different from each other, and the base portion 310 is located in the Y1-direction with respect to the base portion 410. Therefore, in a plan view of the base 2, the virtual line segment LV is slightly inclined with respect to the X-axis. In the present embodiment, it may be considered that the virtual line segment LV is parallel to the X-axis in a plan view of the base 2. In addition, the virtual line segment LV may be parallel to the X-axis in a plan view of the base 2.

The maintenance unit 8 is disposed at a position in the Y1-direction with respect to the virtual line segment LV. On the other hand, the ink supply unit 6, the imaging unit 7, the maintenance unit 8, and the mounting unit 9 are disposed at positions in the Y2-direction with respect to the virtual line segment LV.

Therefore, in a plan view of the base 2, the virtual line segment LV passes between the curing unit 10 and the maintenance unit 8. In addition, in a plan view of the base 2, the virtual line segment LV passes through an imaging range RI. Therefore, the imaging unit 7 can image an object located at a position close to the virtual line segment LV.

In addition, the maintenance unit 8 is located inside an operation range RR1 of the first robot 3, and is located outside an operation range RR2 of the second robot 4. Here, the first robot 3 uses the maintenance unit 8 to perform maintenance of the head 5a. Accordingly, the maintenance unit 8 needs to be located inside the operation range RR1 of the first robot 3. On the other hand, since the second robot 4 does not use the maintenance unit 8. Accordingly, the maintenance unit 8 does not need to be located inside the operation range RR2 of the second robot 4. When there is no hindrance in the operation of the second robot 4, the maintenance unit 8 may be located inside the operation range RR2 of the second robot 4.

Here, in a plan view of the base 2, the operation range RR1 is a region inside a circle formed around any desired portion of the base portion 310 and having a length LR1 of the arm 320 as a radius. The length LR1 is a distance between both ends of the arm 320 in a linearly stretched state. Similarly, in a plan view of the base 2, the operation range RR2 is a region inside a circle formed around any desired portion of the base portion 410 and having a length LR2 of the arm 420 as a radius. The length LR2 is a distance between both ends of the arm 420 in a linearly stretched state.

The length LR1 and the length LR2 may be equal to each other, or may be different from each other. In the example illustrated in FIG. 5, the length LR1 of the arm 320 of the first robot 3 is shorter than the length LR2 of the arm 420 of the second robot 4. The reason is to increase a degree of freedom in handling the workpiece W by the second robot 4 and to reduce vibration during an movement of the first robot 3. Here, from a viewpoint of reducing the vibration during the movement of the first robot 3, it is preferable that load capacity of the first robot 3 is larger than load capacity of the second robot 4.

In addition, the maintenance unit 8 is located outside the imaging range RI. The reason is to prevent the following. When the maintenance unit 8 is imaged by the imaging device 7a, a process using the imaging result of the imaging device 7a is complicated. In addition, the maintenance unit 8 is located outside an illumination range RL of the illumination unit 7b. The reason is to prevent the light emitted from the illumination unit 7b from colliding with the head 5a during the maintenance performed by the maintenance unit 8. The illumination range RL in the present embodiment is a range located on a side in the Y1-direction with respect to the illumination unit 7b.

In addition, in a plan view of the base 2, the mounting unit 9 is located on the side the same as that of the maintenance unit 8 with respect to the virtual line segment LV, but is disposed outside the imaging range RI. The reason is to prevent the following. Not only the workpiece W located in the mounting unit 9 does not need to be imaged by the imaging device 7a, but also the process using the imaging result of the imaging device 7a is complicated when the workpiece W is imaged.

In addition, in a plan view of the base 2, each of the curing unit 10 and the maintenance unit 8 is located between a first straight line LS1 passing through the base portion 310 of the first robot 3 and perpendicular to the virtual line segment LV and a second straight line LS2 passing through the base portion 410 of the second robot 4 and perpendicular to the virtual line segment LV. The reason is to miniaturize the three-dimensional object printing apparatus 1.

1-6. Operation of Three-Dimensional Object Printing Apparatus

Figure 6:
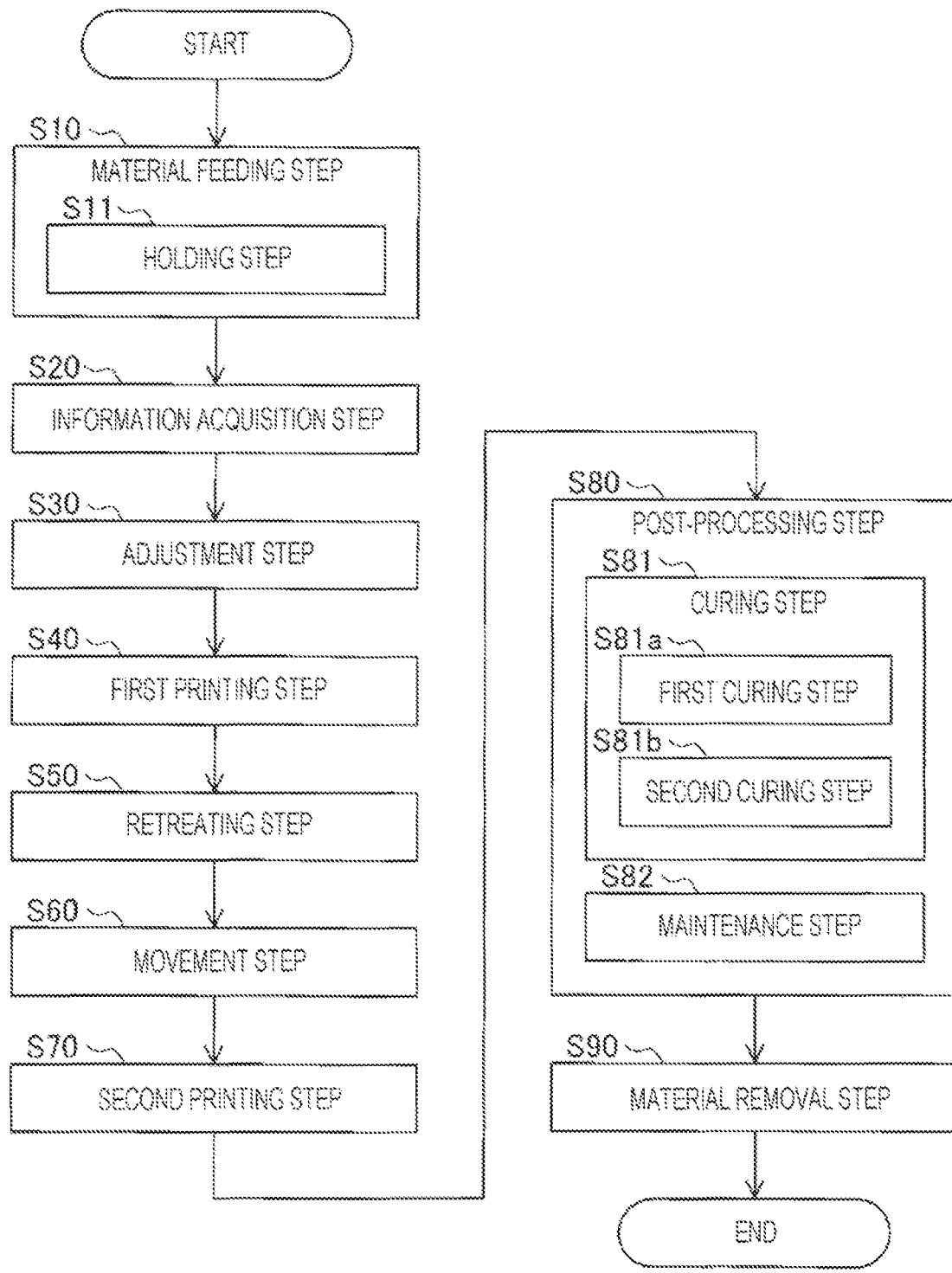
FIG. 6 is a flowchart illustrating an operation flow of the three-dimensional object printing apparatus according to the first embodiment.

FIG. 6 is a flowchart illustrating an operation flow of the three-dimensional object printing apparatus 1 according to the first embodiment. As illustrated in FIG. 6, the three-dimensional object printing apparatus 1 performs a material feeding step S10, an information acquisition step S20, an adjustment step S30, a first printing step S40, a retreating step S50, a movement step S60, a second printing step S70, a post-processing step S80, and a material removal step S90 in this order.

Here, the material feeding step S10 includes a holding step S11. In addition, the post-processing step S80 includes a curing step S81 and a maintenance step S82, and the curing step S81 includes a first curing step S81a and a second curing step S81b. Hereinafter, each step will be described in sequence.

1-6-1. Material Feeding Step S10

Figure 7:
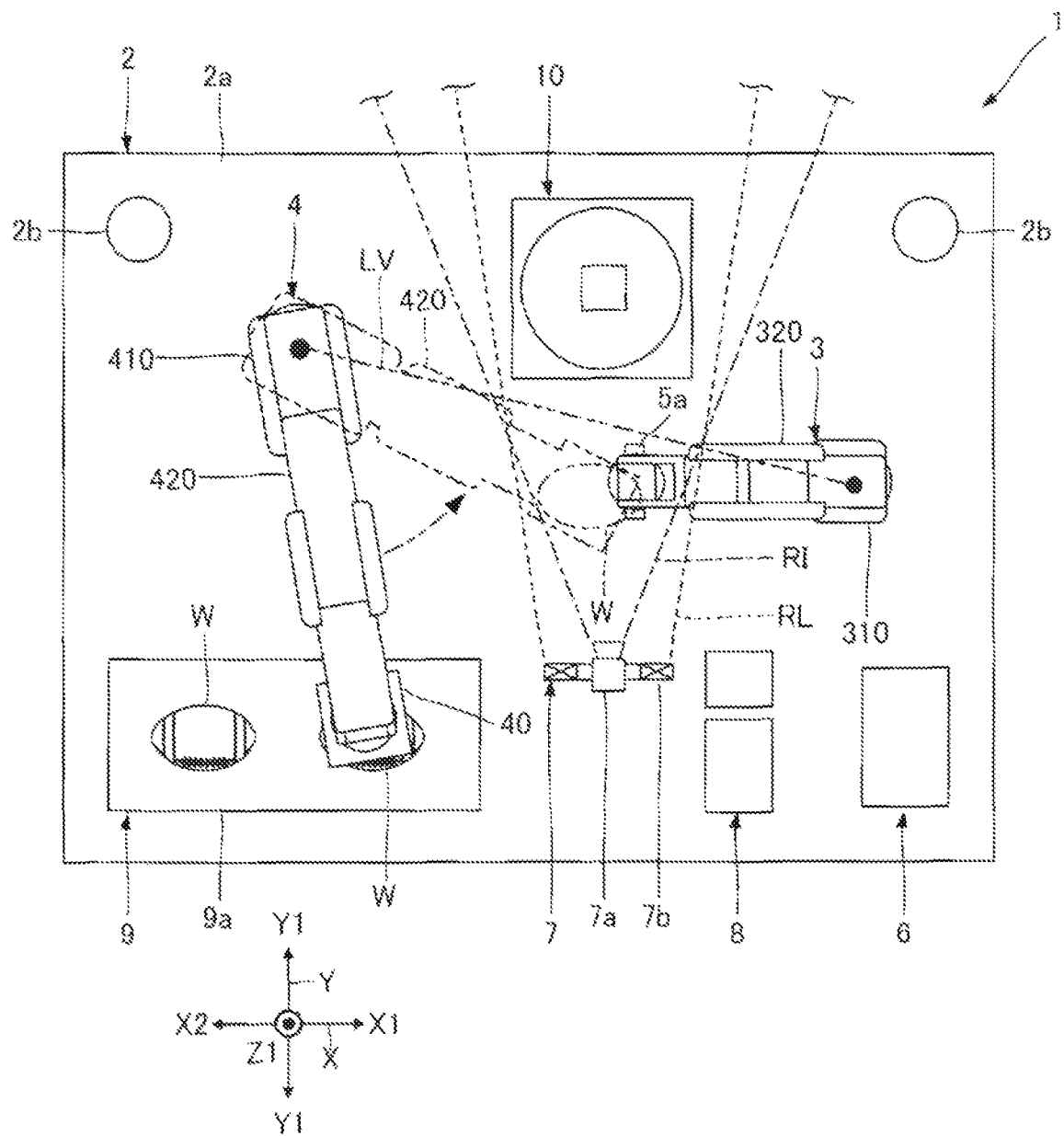
FIG. 7 is a view for describing a material feeding step.

FIG. 7 is a view for describing the material feeding step S10. In the material feeding step S10, the holding step S11 is first performed. In the holding step S11, as indicated by a solid line in FIG. 7, the hand mechanism 40 holds the workpiece W located in the mounting unit 9 in a state where the second robot 4 brings the hand mechanism 40 close to the mounting unit 9. In this manner, the hand mechanism 40 receives the workpiece W supplied from the mounting unit 9. Thereafter, as indicated by a two-dot chain line in FIG. 7, the second robot 4 moves the workpiece W from the outside to the inside of the imaging range RI.

In this step, an operation state of the first robot 3 is not particularly limited, and is determined in any desired way. In addition, in this step, each operation state of the imaging unit 7 and the curing unit 10 is not particularly limited. However, when the head 5a is not covered by the maintenance unit 8, depending on the position or the posture of the head 5a, it is preferable to turn off the illumination unit 7b of the imaging unit 7 or to turn off the light source 10b of the curing unit 10.

1-6-2. Information Acquisition Step S20

In the information acquisition step S20, in a state where the second robot 4 holds the workpiece W as indicated by the two-dot chain line in FIG. 7, the controller 11 acquires information relating to the relative position of the workpiece W with respect to the base 2, based on the imaging result of the imaging device 7a.

In this step, the illumination unit 7b is turned on. Therefore, from a viewpoint of preventing the ink in the vicinity of the nozzle N from being cured or solidified by the light emitted from the illumination unit 7b, it is preferable that the first robot 3 causes the nozzle surface F to be located outside the illumination range RL of the illumination unit 7b. Alternatively, it is preferable that the nozzle surface F is directed in a direction that is shaded by the light emitted from the illumination unit 7b. From the same viewpoint, it is preferable that the nozzle N is covered by the maintenance unit 8 in this step.

In addition, in this step, from a viewpoint of improving accuracy of information relating to the position based on the imaging result of the imaging device 7a, it is preferable that the head 5a is located outside the imaging range RI. Here, in this step, at least one of the first robot 3 and the second robot 4 may have a portion located inside the imaging range RI. However, in this case, from a viewpoint of improving the accuracy of the information relating to the position, it is preferable that a color of the workpiece W and a color of the portion of the first robot 3 and the second robot 4 are different from each other. For example, the portion of the first robot 3 and the second robot 4 is painted in a color different from that of the workpiece W. In this manner, it is possible to improve contrast between the workpiece W in the image captured by the imaging device 7a and the portion serving as a background thereof. In this manner, processing of the imaging result in the processing circuit 11b is easily performed. Accordingly, the accuracy of the information relating to the position is improved. When the portion is painted in a black color, the contrast is easily maintained in the captured image even when the color differs depending on the workpiece W.

1-6-3. Adjustment Step S30

In the adjustment step S30, the controller 11 controls an operation of the second robot 4, based on the information acquired in the information acquisition step S20. In this manner, the position of the workpiece W located inside the imaging range RI is adjusted.

The position and the posture of the workpiece W after adjustment by performing this step are in a first state, and are the position and the posture of the workpiece W when the first printing step S40 is performed. Here, in a plan view of the base 2, the position of the workpiece W after adjustment by performing this step is closer to the virtual line segment LV than the position of the workpiece W when the above-described holding step S11 is performed. In addition, in a plan view of the base 2, the position of the workpiece W after the adjustment by performing this step is closer to the virtual line segment LV than when the curing step S81 and the maintenance step S82 are performed.

1-6-4. First Printing Step S40

Figure 8:
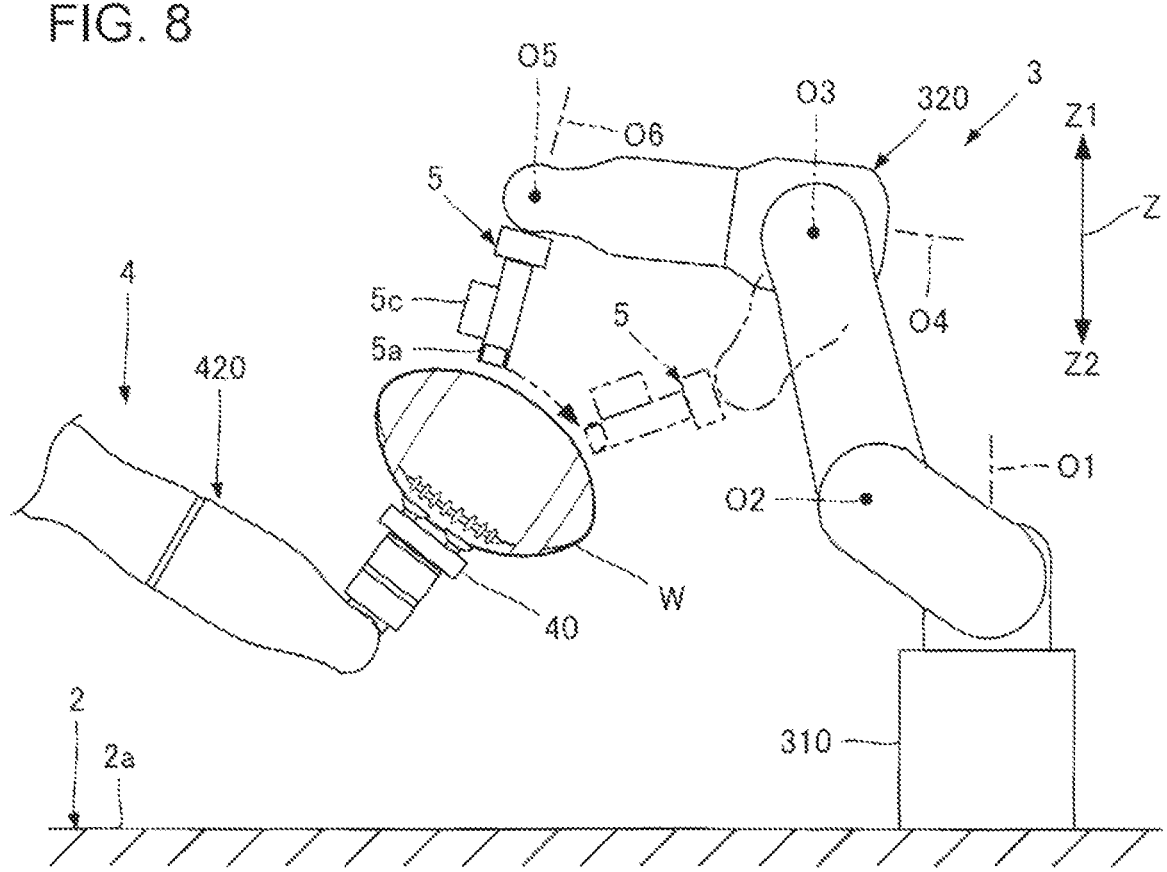
FIG. 8 is a view for describing an operation of the first robot in a first printing step.

FIG. 8 is a view for describing an operation of the first robot 3 in the first printing step S40. In the first printing step S40, as illustrated in FIG. 8, in a state where the second robot 4 fixes the position and the posture of the workpiece W in the first state, while the first robot 3 relatively moves the head 5a and the workpiece W inside the imaging range RI, the head 5a discharges the ink to the workpiece W. In the example illustrated in FIG. 8, the first robot 3 moves the head 5a in a direction along a long axis of the workpiece W. The posture of the workpiece W in the first printing step S40 is not particularly limited, and is selected in any desired way.

In this way, in this step, the first robot 3 is moved without moving the second robot 4. Therefore, the vibration of the workpiece W can be prevented. The vibration is likely to occur since the workpiece W is held to be attachable and detachable by the hand mechanism 40. When the second robot 4 is moved in the first printing step, the vibration is remarkable. A landing position of an ink droplet deviates, thereby leading to degradation in image quality. In addition, even when rigidity of the workpiece W is low due to the material and the shape, the vibration of the workpiece W is remarkable, thereby also leading to degradation in image quality. In contrast, the head 5a mounted on the first robot is not held by the hand mechanism, and the vibration is less likely to occur compared to the workpiece W. Therefore, in this step, the first robot 3 is moved without moving the second robot 4. In this manner, the degradation in the image quality which is caused by the vibration as described above can be suppressed. Here, from a viewpoint of reducing meandering of a movement route of the head 5a, it is preferable that the number of joints rotated by the first robot 3 in this step is as small as possible. In addition, it is preferable that the first robot 3 is moved by an rotation of the joints of the three pivoting axes parallel to each other. In the example illustrated in FIG. 8, the three pivoting axes are the pivoting axis O2, the pivoting axis O3, and the pivoting axis O5.

In this step, from a viewpoint of preventing the ink in the vicinity of the nozzle N from being cured or solidified by the light emitted from the illumination unit 7b, it is preferable to turn off the illumination unit 7b.

Figure 9:
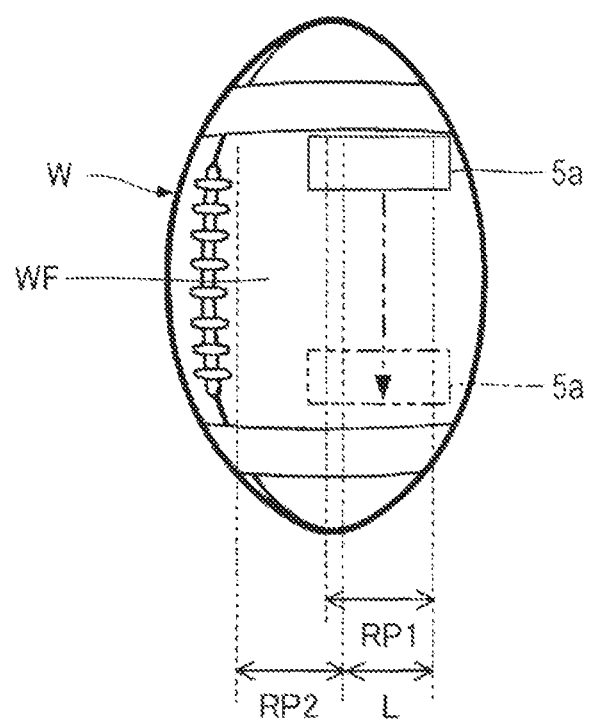
FIG. 9 is a view for describing a print region of a workpiece in the first printing step.

FIG. 9 is a view for describing a print region of the workpiece W in the first printing step S40. As illustrated in FIG. 9, in this step, while the first robot 3 causes the head 5a to perform scanning along a first region RP1 out of the first region RP1 and a second region RP2 which are different from each other in the workpiece W, the head 5a discharges the ink to the first region RP1. In the example illustrated in FIG. 9, portions of the first region RP1 and the second region RP2 overlap each other. The first region RP1 and the second region RP2 may not overlap each other. For example, the first region RP1 and the second region RP2 may have a front-to-back relationship.

In this step, the temporary curing light source 5c may be turned on. In this case, the ink on the workpiece W can temporarily be cured. After this step, in a state where the ink is not discharged from the head 5a, the temporary curing light source 5c may be turned on while the first robot 3 causes the temporary curing light source 5c to perform scanning along the first region RP1.

1-6-5. Retreating Step S50

Figure 10:
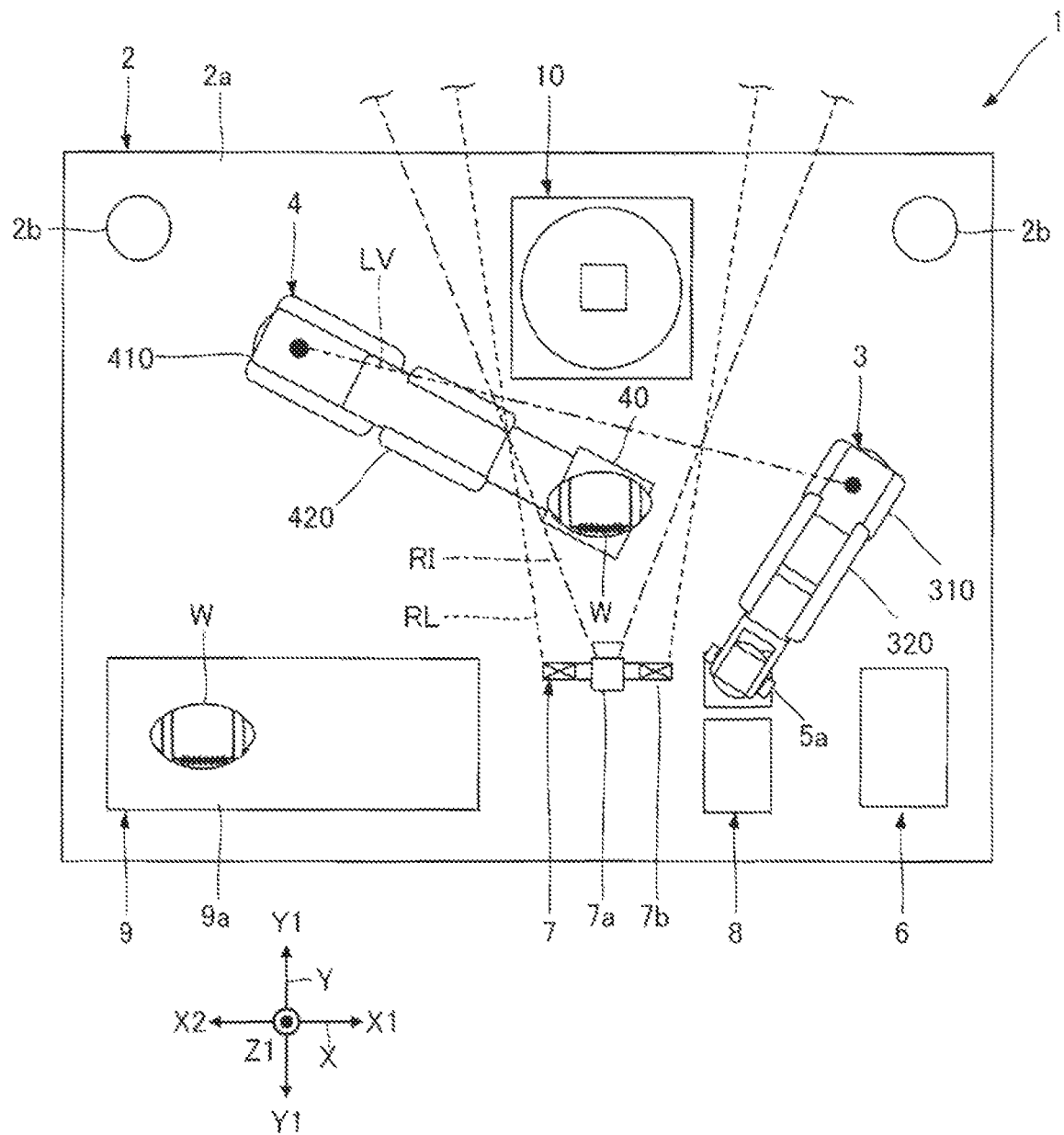
FIG. 10 is a view for describing a retreating step.

FIG. 10 is a view for describing the retreating step S50. In the retreating step S50, as illustrated in FIG. 10, the first robot 3 increases a distance between the head 5a and the workpiece W than a distance when the first printing step S40 is performed. In the example illustrated in FIG. 10, a state where the head 5a is covered by the maintenance unit 8 is illustrated as an example. In this step, the head 5a may not be covered by the maintenance unit 8. However, in this case, depending on the position or the posture of the head 5a, it is preferable to turn off the illumination unit 7b of the imaging unit 7 or to turn off the light source 10b of the curing unit 10.

1-6-6. Movement Step S60

Figure 11:
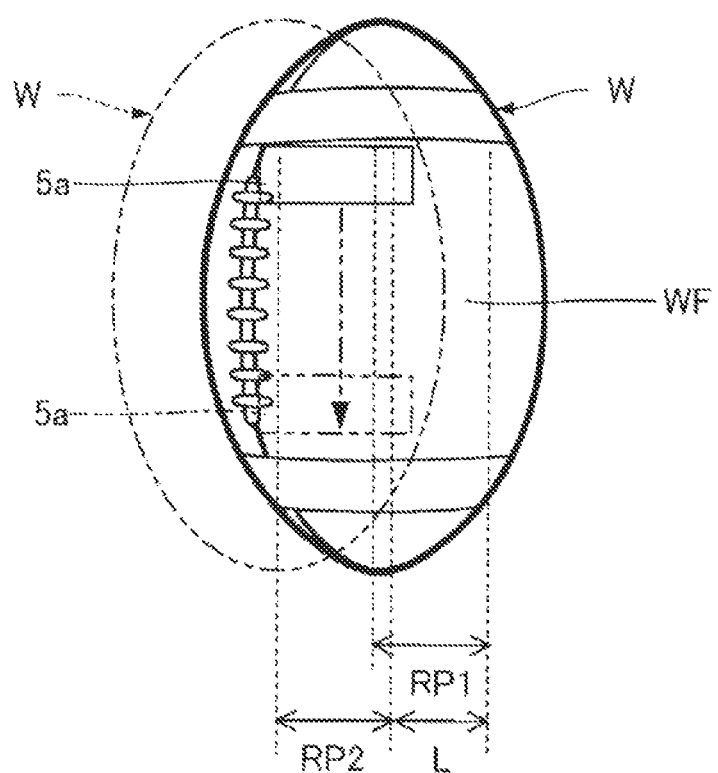
FIG. 11 is a view for describing a movement step.

FIG. 11 is a view for describing the movement step S60. In the movement step S60, the second robot 4 changes the position and the posture of the workpiece W from the first state to the second state different from the first state. In the example illustrated in FIG. 11, the first state is a state indicated by a two-dot chain line in FIG. 11, and the second state is a state indicated by a solid line in FIG. 11. The second state is a state of the position and the posture of the workpiece W when the second printing step S70 is performed. This step may include a step of adjusting the position of the workpiece W in the same manner as in the above-described adjustment step S30.

1-6-7. Second Printing Step S70

In the second printing step S70, as illustrated in FIG. 11, printing is performed in the same manner as in the first printing step S40 described above, except that the printing is performed on the second region RP2. Here, in the second printing step S70, in a state where the second robot 4 fixes the position and the posture of the workpiece W in the second state, while the first robot 3 relatively moves the head 5a and the workpiece W inside the imaging range RI, the head 5a discharges the ink to the workpiece W. In addition, the operation of the first robot 3 in this step is the same as the operation of the first robot 3 in the above-described first printing step S40.

In this step, the temporary curing light source 5c may be turned on. In this case, the ink on the workpiece W can temporarily be cured. After this step, in a state where the ink is not discharged from the head 5a, the temporary curing light source 5c may be turned on while the first robot 3 causes the temporary curing light source 5c to perform scanning along the second region RP2.

1-6-8. Post-Processing Step S80

Figure 12:
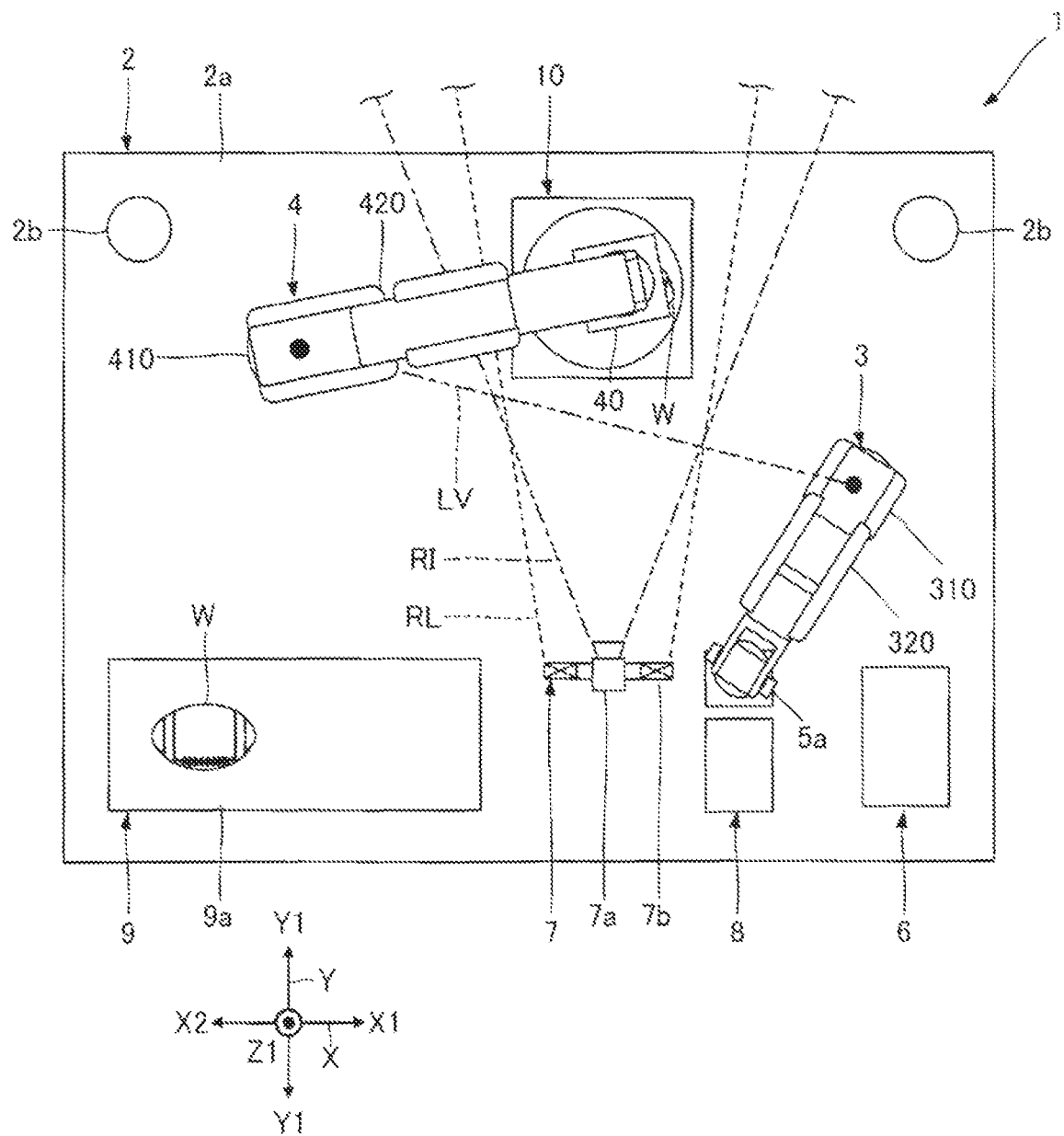
FIG. 12 is a view for describing a curing step and a maintenance step.

FIG. 12 is a view for describing the curing step S81 and the maintenance step S82. As described, the post-processing step S80 includes the curing step S81 and the maintenance step S82.

In the curing step S81, as illustrated in FIG. 12, in a state where the second robot 4 brings the workpiece W close to the curing unit 10, the curing unit 10 irradiates the ink on the workpiece W with energy. Here, in the present embodiment, as described, the curing step S81 includes the first curing step S81a and the second curing step S81b.

In the first curing step S81a, while the second robot 4 changes the relative positions and postures of the curing unit 10 and the workpiece W, the curing unit 10 irradiates the ink on the first region RP1 with the energy. In the second curing step S81b, while the second robot 4 changes the relative positions and postures of the curing unit 10 and the workpiece W, the curing unit 10 irradiates the ink on the second region RP2 with the energy. In the steps, any configuration may be adopted as long as the ink can be irradiated with the energy, and there is no problem caused by the vibration of the workpiece W as in the first printing step S40 and the second printing step S70. Here, it is preferable that the first curing step S81a and the second curing step S81b are performed in this order. The reason is as follows. A difference between the image quality of the first region RP1 and the image quality of the second region RP2 can be reduced by reducing a time difference until the ink is irradiated with the energy after the ink is discharged, between the ink on the first region RP1 and the ink on the second region RP2. The first curing step S81a and the second curing step S81b may be performed substantially at the same time.

In the maintenance step S82, as illustrated in FIG. 12, in a state where the first robot 3 brings the head 5a close to the maintenance unit 8, the maintenance unit 8 performs the maintenance on the head 5a. The maintenance means covering the nozzle and the nozzle surface with the cap of the unit 8a, suctioning the ink from the nozzle of the head 5a in a state where the nozzle and the nozzle surface is covered by the cap, cleaning the nozzle surface of the head 5a by using a wiper of the unit 8a, and printing a pattern for inspection by the head 5a in the unit 8b. However, when the illumination unit 7b or the curing unit 10 emits the light while the maintenance step S82 is performed, it is preferable that the maintenance is an operation in which the nozzle and the nozzle surface are covered by the cap. Here, from a viewpoint of shortening a processing time, it is preferable that the maintenance step S82 is performed while the first curing step S81a is performed.

In addition, from a viewpoint of reducing image blurring caused by a flow of the ink on the workpiece W by immediately curing the ink on the workpiece W, it is preferable that the position of the workpiece W when the curing step S81 is performed is close to the position of the workpiece W when the first printing step S40 or the second printing step S70 is performed. Therefore, it is preferable that a workpiece movement distance DW which is a movement distance of the workpiece W required for proceeding to the curing step S81 from the first printing step S40 or the second printing step S70 is shorter than a head movement distance DH which is a movement distance of the head 5a required for proceeding to the maintenance step S82 from the first printing step S40 or the second printing step S70.

In a plan view of the base 2, the workpiece movement distance DW is a distance between the workpiece W when the first printing step S40 or the second printing step S70 is performed and the workpiece W when the curing step S81 is performed. In a plan view of the base 2, the head movement distance DH is a distance between the head 5a when the first printing step S40 or the second printing step S70 is performed and the head 5a when the maintenance step S82 is performed.

1-6-9. Material Removal Step S90

Figure 13:
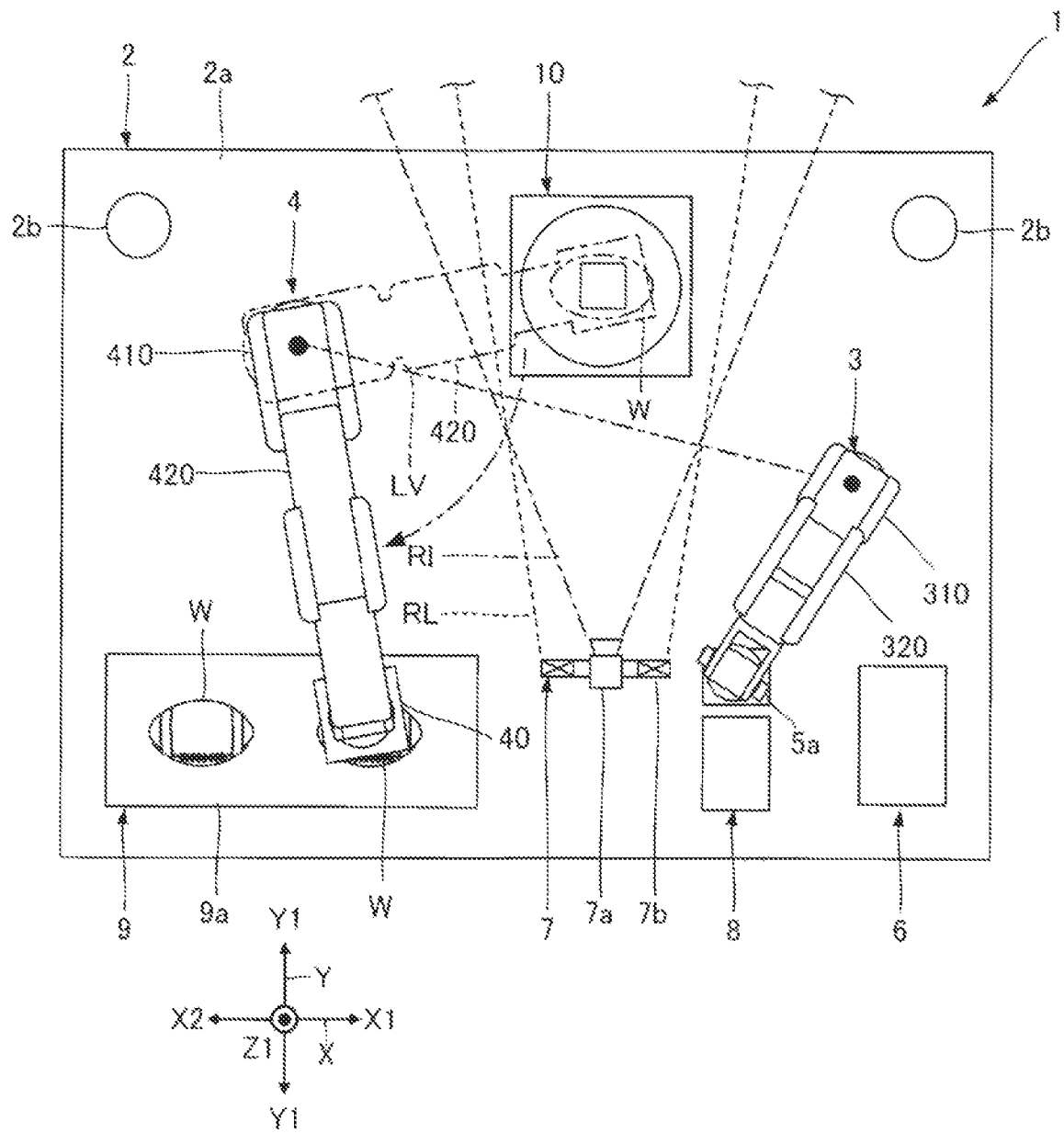
FIG. 13 is a view for describing a material removal step.

FIG. 13 is a view for describing the material removal step S90. In the material removal step S90, as illustrated in FIG. 13, the second robot 4 first moves the workpiece W to the mounting unit 9. In this state, the hand mechanism 40 separates the workpiece W. In this manner, the printed workpiece W is mounted on the mounting unit 9. The printed workpiece W mounted on the mounting unit 9 is removed out of the case 20 by a user, for example.

In this step, an operation state of the first robot 3 is not particularly limited, and is determined in any desired way. In addition, in this step, each operation state of the imaging unit 7 and the curing unit 10 is not particularly limited. However, when the head 5a is not covered by the maintenance unit 8, depending on the position or the posture of the head 5a, it is preferable to turn off the illumination unit 7b of the imaging unit 7 or to turn off the light source 10b of the curing unit 10. In this step, the maintenance step S82 may be performed.

As described above, the three-dimensional object printing apparatus 1 performs printing on the three-dimensional workpiece W. Here, as described above, the three-dimensional object printing apparatus 1 has the imaging device 7a, the first robot 3, and the second robot 4. The imaging device 7a is fixed to the base 2, and images the object located inside the imaging range RI. The first robot 3 supports the head 5a having the nozzle N for discharging the ink which is an example of the "liquid", and changes the position and the posture of the head 5a. The second robot 4 supports the workpiece W, and changes the position and the posture of the workpiece W.

Then, as described above, the three-dimensional object printing apparatus 1 performs the material feeding step S10 and the first printing step S40 or the second printing step S70 which is an example of the "printing step". In the material feeding step S10, the second robot 4 moves the workpiece W from the outside to the inside of the imaging range RI. In the first printing step S40 or the second printing step S70, while at least one of the first robot 3 and the second robot 4 relatively moves the head 5a and the workpiece W inside the imaging range RI, the head 5a discharges the ink to the workpiece W.

In the above-described three-dimensional object printing apparatus, the first robot 3 and the second robot 4 are used so that each position and each posture of the head 5a and the workpiece W can independently be changed. Therefore, compared to a configuration in which the position and the posture of only one of the head 5a and the workpiece W are changed, the head 5a can be brought close to the workpiece W over a wide range of the workpiece W. As a result, even when the workpiece W has various three-dimensional shapes, printing can suitably be performed on the workpiece W.

Then, in the first printing step S40 or the second printing step S70, at least one of the first robot 3 and the second robot 4 relatively moves the head 5a and the workpiece W inside the imaging range RI of the imaging device 7a. Therefore, the position and the posture of the workpiece W when the first printing step S40 or the second printing step S70 is performed can be detected, based on the imaging result of the imaging device 7a. Therefore, in the first printing step S40 or the second printing step S70, even when a support position of the workpiece W supported by the second robot 4 deviates, at least one operation of the first robot 3 and the second robot 4 is controlled, based on the imaging result of the imaging device 7a. In this manner, an error occurring in a relationship of the relative positions and postures of the head 5a and the workpiece W can be reduced by correction. According to the above-described configuration, in the first printing step S40 or the second printing step S70, degradation in image quality can be reduced, compared to a configuration in which the operations of the first robot 3 and the second robot 4 are controlled without using the imaging result of the imaging device 7a.

As described above, the second robot 4 has the hand mechanism 40 that holds the workpiece W to be attachable and detachable. When the hand mechanism 40 is used for the second robot, the support position of the workpiece W supported by the second robot 4 is likely to deviate from a desired position. Therefore, in this case, an advantageous effect obtained by controlling the operation of at least one of the first robot 3 and the second robot 4, based on the imaging result of the imaging device 7a is remarkable.

In addition, as described above, each of the first robot 3 and the second robot 4 is a vertical articulated robot. Therefore, the positions and the postures of the head 5a and the workpiece W can be changed in various ways, compared to a configuration of using other mechanisms such as a horizontal articulated robot.

Here, as described above, it is preferable that the length LR1 of the arm 320 of the first robot 3 is shorter than the length LR2 of the arm 420 of the second robot 4. In this case, there is an advantage in that the vibration during movement of the first robot 3 can be easily reduced compared to the second robot 4. This advantage contributes to improvement of image quality. In addition, since the length of the arm 420 of the second robot 4 is longer than the length of the arm 320 of the first robot 3, an operation range of the second robot 4 can be increased. Therefore, the material of the workpiece W can be fed or removed at any desired point within a wide range, and it is possible to perform processing for curing or solidifying the ink on the workpiece W.

In addition, as described above, it is preferable that load capacity of the first robot 3 is larger than load capacity of the second robot 4. In this case, there is an advantage in that the vibration during movement of the first robot 3 can be easily reduced compared to the second robot 4. This advantage contributes to improvement of image quality. In particular, as a weight of the end effector of the first robot 3 becomes heavier, an advantageous effect is more remarkable.

As described above, the three-dimensional object printing apparatus 1 further includes the mounting unit 9. The mounting unit 9 is disposed outside the imaging range RI, and the workpiece W can be mounted thereon. The hand mechanism 40 receives the workpiece W supplied from the mounting unit 9. Since the mounting unit 9 is disposed outside the imaging range RI of the imaging device 7a in this way, it is possible to prevent fluctuations in imaging conditions of the imaging device 7a which are caused by the presence or absence of the workpiece W or a change in the mounting unit 9. Therefore, compared to a configuration in which the mounting unit 9 is disposed inside the imaging range RI, the process using the imaging result of the imaging device 7a can be simplified. In the present embodiment, a configuration in which the mounting unit 9 is used for both supply and removal of the workpiece W has been described as an example. However, the configuration is not limited thereto. For example, the mounting unit 9 may be used only for supply of the workpiece. In this case, for example, a table or a conveyor on which the workpiece W can be mounted is provided separately from the mounting unit 9.

In addition, as described above, the three-dimensional object printing apparatus 1 performs the information acquisition step S20 between the material feeding step S10 and the first printing step S40 or the second printing step S70. In the information acquisition step S20, information relating to the relative position of the workpiece W with respect to the base 2 is acquired, based on the imaging result of the imaging device 7a. Therefore, based on the information acquired in the information acquisition step S20, the position of the workpiece W after the material feeding step S10 can be detected. Based on the detected position, the adjustment step S30, the first printing step S40, or the second printing step S70 can be performed.

Here, in the information acquisition step S20, as described above, the head 5a is located outside the imaging range RI. Therefore, in the information acquisition step S20, it is not necessary to consider the presence of the head 5a in order to acquire the information relating to the relative position of the workpiece W with respect to the base 2. As a result, compared to a configuration in which the head 5a is located inside the imaging range RI of the imaging device 7a, the processing in the information acquisition step S20 can be simplified, or accuracy of the information acquired in the information acquisition step S20 can be improved.

In addition, as described above, the three-dimensional object printing apparatus 1 further has the maintenance unit 8 covering the nozzle N. The maintenance unit 8 is located outside the imaging range RI. Therefore, the maintenance unit 8 is not imaged by the imaging device 7a. Accordingly, the process using the imaging result of the imaging device 7a can be simplified. In addition, in the information acquisition step S20, the nozzle N is covered by the maintenance unit 8. Therefore, it is possible to prevent the ink in the vicinity of the nozzle N from being cured or solidified by the illumination for imaging the imaging device 7a.

Here, as described above, the maintenance unit 8 is located inside the operation range RR1 of the first robot 3, and is located outside the operation range RR2 of the second robot 4. Therefore, it is possible to prevent the maintenance unit 8 from becoming an obstacle to the operation of the second robot 4. In addition, there is an advantage in that it is easy to prevent the ink in the vicinity of the nozzle N from being cured or solidified by the energy from the curing unit 10 when the curing step S81 is performed.

In addition, as described above, the three-dimensional object printing apparatus 1 further performs the adjustment step S30 between the information acquisition step S20 and the first printing step S40 or the second printing step S70. In the adjustment step S30, the position of the workpiece W located inside the imaging range RI is adjusted. Here, in the adjustment step S30, the operation of the second robot 4 is controlled, based on the information acquired in the information acquisition step S20. Therefore, even when the support position of the workpiece W supported by the second robot 4 deviates from a desired position, the deviation can be corrected. The above-described movement step S60 may include a process the same as that in the adjustment step S30.

In addition, as described above, the three-dimensional object printing apparatus 1 further has the illumination unit 7b that illuminates the inside of the imaging range RI. Here, in the information acquisition step S20, the illumination unit 7b is turned on. Therefore, in the information acquisition step S20, the contrast of the workpiece W is improved by the illumination of the illumination unit 7b. Accordingly, accuracy of the information obtained in the information acquisition step S20 can be improved. In contrast, in the first printing step S40 or the second printing step S70, the illumination unit 7b is turned off. Therefore, in the first printing step S40 or the second printing step S70, it is possible to prevent the ink in the vicinity of the nozzle N from being cured or solidified by the illumination of the illumination unit 7b.

Here, as described above, the maintenance unit 8 is located outside the illumination range RL of the illumination unit 7b. Therefore, it is possible to prevent the ink in the vicinity of the nozzle N from being cured or solidified by the illumination of the illumination unit 7b.

In addition, as described above, the head 5a has the nozzle surface F on which the nozzle N is provided. The nozzle surface F is located outside the illumination range RL of the illumination unit 7b when the illumination unit 7b is turned on, or faces a direction that is shaded by the light emitted from the illumination unit 7b. Therefore, it is possible to prevent the ink in the vicinity of the nozzle N from being cured or solidified by the illumination of the illumination unit 7b.

Here, as described above, in the information acquisition step S20, it is preferable that a color of at least a portion of the first robot 3 located inside the imaging range RI is different from a color of the workpiece W. In this case, in the information acquisition step S20, the contrast of the workpiece W is improved by the illumination of the illumination unit 7b. Accordingly, accuracy of the information obtained in the information acquisition step S20 can be improved.

Similarly, in the information acquisition step S20, it is preferable that a color of at least a portion of the second robot 4 located inside the imaging range RI is different from a color of the workpiece W. In this case, in the information acquisition step S20, the contrast of the workpiece W is improved by the illumination of the illumination unit 7b. Accordingly, accuracy of the information obtained in the information acquisition step S20 can be improved.

In addition, as described above, the first robot 3 has the base portion 310 which is an example of the "first base portion" fixed to the base 2. Similarly, the second robot 4 has the base portion 410, which is an example of the "second base portion" fixed to the base 2. Here, in a plan view of the base 2, the virtual line segment LV connecting the base portion 310 and the base portion 410 passes through the imaging range RI. Therefore, compared to a case where the virtual line segment LV does not pass through the imaging range RI in a plan view of the base 2, a degree of freedom in the positions and the postures of the workpiece W and the head 5a in the imaging range RI can be increased.

As described above, attachment directions of the base portion 310 of the first robot 3 and the base portion 410 of the second robot 4 with respect to the base 2 are not limited to the example of the present embodiment, and can appropriately be changed. For example, both or one of the first robot 3 and the second robot 4 may be fixed to be suspended from a ceiling or a beam provided along the X-direction or the Y-direction, or both or one of the first robot 3 and the second robot 4 may be fixed to a wall surface provided along the Z-direction.

Here, the "plan view of the base 2" will be described. When the base portion 310 of the first robot 3 and the base portion 410 of the second robot 4 are fixed to the base 2 in the same attachment direction as in the present embodiment, the "plan view of the base 2" means a state viewed in a direction along the attachment direction. For example, in the present embodiment, the attachment direction is the Z-direction, and the "plan view of the base 2" is in a state viewed in the Z-direction. On the other hand, unlike the present embodiment, when the base portion 310 of the first robot 3 and the base portion 410 of the second robot 4 are fixed to the base 2 in different attachment directions, the "plan view of the base 2" means a state viewed in a direction along the attachment direction of one robot selected in any desired way from the first robot 3 and the second robot 4.

In addition, as described above, when the ink discharged from the head 5*a* has a photocurable property, the ink can remain at a desired position by causing the curing unit 10 to cure the ink on the workpiece W. As a result, printing can highly accurately be performed on the three-dimensional workpiece W.

As described above, the three-dimensional object printing apparatus 1 performs the first printing step S40. In the first printing step S40, while the first robot 3 causes the head 5*a* to perform scanning along the first region RP1 of the workpiece W, the head 5*a* discharges the ink to the first region RP1. Therefore, printing can be performed on the first region RP1 of the workpiece W. Here, in the first printing step S40, the second robot 4 fixes the position and the posture of the workpiece W in the first state. Therefore, the vibration of the workpiece W in the first printing step S40 is prevented. As a result, the image quality can be improved, compared to a configuration in which the second robot 4 is operated in the first printing step S40.

In addition, as described above, the three-dimensional object printing apparatus 1 further has the curing unit 10. The curing unit 10 is fixed to the base 2, and emits the energy for curing or solidifying the ink discharged from the head 5*a*. The three-dimensional object printing apparatus 1 performs the first curing step S81*a* after the first printing step S40 is performed. In the first curing step S81*a*, while the second robot 4 changes the relative positions and postures of the curing unit 10 and the workpiece W, the curing unit 10 irradiates the ink on the first region RP1 with the energy. Therefore, in the first curing step S81*a*, the ink discharged to the workpiece W in the first printing step S40 can be cured or solidified by the energy emitted from the curing unit 10.

Here, in the first curing step S81*a*, the second robot 4 changes the relative positions and postures of the curing unit 10 and the workpiece W. Accordingly, even when the curing unit 10 is fixed to the base 2, the ink on the workpiece W can suitably be irradiated with the energy emitted from the curing unit 10. In the first curing step S81*a*, even when the workpiece W vibrates, a problem as in the printing does not occur. In addition, control accuracy of the position and the posture of the workpiece W in the first curing step S81*a* may be lower than control accuracy of the position and the posture of the head 5*a* in the first printing step S40.

As described above, it is preferable that the three-dimensional object printing apparatus 1 performs the maintenance step S82 while the first curing step S81*a* is performed. In the maintenance step S82, the maintenance unit 8 performs maintenance on the head 5*a*. In this way, at least portions of a performance period of the curing step S81 and a performance period of the maintenance step S82 overlap each other. Accordingly, compared to a case where the maintenance step S82 is not performed while the first curing step S81*a* is performed, a time required for the steps can be shortened.

Here, the first curing step S81*a* is performed by using the second robot 4 without using the first robot 3. In contrast, the maintenance step S82 is performed by using the first robot 3 without using the second robot 4. Therefore, the maintenance step S82 can be performed while the first curing step S81*a* is performed. In addition, the head 5*a* is covered by the maintenance unit 8 when the maintenance step S82 is performed. Accordingly, it is possible to prevent the ink in the vicinity of the nozzle N from being cured or solidified by the energy emitted from the curing unit 10 in the first curing step S81*a*.

In addition, as described above, the three-dimensional object printing apparatus 1 performs the movement step S60 after the first printing step S40 is performed. In the movement step S60, the second robot 4 changes the position and the posture of the workpiece W from the above-described first state to the second state different from the first state. Therefore, after the movement step S60 is performed, printing can be performed on a region different from the print region in the first printing step S40 of the workpiece W by performing the operation of the first robot 3 which is the same as that in the first printing step S40. In the movement step S60, the position of the workpiece W is adjusted in the same manner as in the above-described adjustment step S30, when necessary.

Here, as described above, the three-dimensional object printing apparatus 1 performs the second printing step S70 after the movement step S60 is performed. In the second printing step S70, while the first robot 3 causes the head 5*a* to perform scanning along the second region RP2 different from the first region RP1 of the workpiece W, the head 5*a* discharges the ink to the second region RP2. Therefore, printing can be performed on the second region of the workpiece W. Here, in the second printing step S70, the second robot 4 fixes the position and the posture of the workpiece W in the above-described second state. Therefore, the vibration of the workpiece W in the second printing step S70 is prevented. As a result, the image quality can be improved, compared to a configuration in which the second robot 4 is operated in the second printing step S70.

In the present embodiment, as described above, the operation of the first robot 3 in the first printing step S40 and the operation of the first robot 3 in the second printing step S70 are the same as each other. Therefore, compared to a case where the operations of the first robot 3 in the steps are different from each other, a difference in the movement route of the head 5*a* in the steps can be reduced. The reason is that reproducibility of the movement route of the head 5*a* is improved by repeating the same operation of the first robot 3. In this way, since the difference in the movement route of the head 5*a* in the steps is reduced, the image quality in the first printing step S40 and the second printing step S70 can be improved.

Here, the first robot 3 is operated by the movement of the joints of the three pivoting axes parallel to each other. In this manner, meandering of the movement route of the head 5*a* can be reduced.

In addition, as described above, the three-dimensional object printing apparatus 1 performs the second curing step S81*b* after the second printing step is performed. In the second curing step S81*b*, while the second robot 4 changes the relative positions and postures of the curing unit 10 and the workpiece W, the curing unit 10 irradiates the ink on the second region RP2 with the energy. Therefore, in the second curing step S81*b*, the ink discharged to the workpiece W in the second printing step S70 can be cured or solidified by the energy emitted from the curing unit 10.

Here, in the second curing step S81*b*, the second robot 4 changes the relative positions and postures of the curing unit 10 and the workpiece W. Accordingly, even when the curing unit 10 is fixed to the base 2, the ink on the workpiece W can suitably be irradiated with the energy emitted from the curing unit 10. In the second curing step S81*b*, even when the workpiece W vibrates, a problem as in the printing does not occur. In addition, control accuracy of the position and the posture of the workpiece W in the second curing step S81*b* may be lower than control accuracy of the position and the posture of the head 5*a* in the second printing step S70.

As described above, it is preferable that the three-dimensional object printing apparatus 1 performs the maintenance step S82 while the second curing step S81b is performed. In the maintenance step S82, the maintenance unit 8 performs maintenance on the head 5a. In this way, at least portions of a performance period of the curing step S81 and a performance period of the maintenance step S82 overlap each other. Accordingly, compared to a case where the maintenance step S82 is not performed while the second curing step S81b is performed, a time required for the steps can be shortened.

Here, the second curing step S81b is performed by using the second robot 4 without using the first robot 3. In contrast, the maintenance step S82 is performed by using the first robot 3 without using the second robot 4. Therefore, the maintenance step S82 can be performed while the second curing step S81b is performed. In addition, the head 5a is covered by the maintenance unit 8 when the maintenance step S82 is performed. Accordingly, it is possible to prevent the ink in the vicinity of the nozzle N from being cured or solidified by the energy emitted from the curing unit 10 in the second curing step S81b.

As described above, it is preferable that the three-dimensional object printing apparatus 1 performs the first printing step S40, the second printing step S70, the first curing step S81a, and the second curing step S81b in this order. In this case, the first printing step S40 and the second printing step S70 can consecutively be performed. Therefore, there is an advantage in that the difference in the movement route of the head 5a in the first printing step S40 and the second printing step S70 can easily be reduced. In addition, the first curing step S81a and the second curing step S81b are performed in this order. In this manner, compared to a case where the first curing step S81a and the second curing step S81b are performed in the reverse order, it is possible to reduce a difference in time required until the ink is irradiated with the energy in each of the curing steps after the ink is discharged in each of the printing steps. According to this configuration, it is possible to reduce a difference in the image quality between the images formed by performing different printing steps. The first curing step S81a and the second curing step S81b may be performed substantially at the same time.

In addition, as described above, the three-dimensional object printing apparatus 1 performs the retreating step S50 between the first printing step S40 and the movement step S60. In the retreating step S50, the first robot 3 increases a distance between the head 5a and the workpiece W than a distance when the first printing step S40 is performed. Therefore, there is an advantage in that the second robot 4 can easily be operated without interfering with the first robot 3 after the retreating step S50 is performed. In addition, after the retreating step S50 is performed, maintenance of the head 5a can be performed at a position where the head 5a is retreated compared to when the first printing step S40 is performed.

In addition, in a plan view of the base 2, in the three-dimensional object printing apparatus 1, the virtual line segment LV passes between the curing unit 10 and the maintenance unit 8. That is, in the two regions divided by the virtual line segment LV, the curing unit 10 is disposed in one region, and the maintenance unit 8 is disposed in the other region. Therefore, when the processes are performed at the same time by the curing unit 10 and the maintenance unit 8, it is possible to prevent the first robot 3 and the second robot 4 from interfering with each other. Specifically, when proceeding from the first printing step S40 or the second printing step S70 to the curing step S81, the first robot 3 and the second robot 4 move the head 5a and the workpiece W in a direction away from each other. Therefore, it is possible to prevent the first robot 3 and the second robot 4 from interfering with each other after the first printing step S40 or the second printing step S70 is performed. In the present embodiment, as described above, the curing step S81 includes the first curing step S81a and the second curing step S81b.

Here, as described above, in a plan view of the base 2, it is preferable that the position of the workpiece W when the first printing step S40 or the second printing step S70 which is the printing step is performed is closer to the virtual line segment LV than the position of the workpiece W when the curing step S81 is performed. As the position of the workpiece W is closer to the virtual line segment LV, a degree of freedom of the operations of the first robot 3 and the second robot 4 is increased when the first printing step S40 or the second printing step S70 is performed. Therefore, the position of the workpiece W is brought closer to the virtual line segment LV when the first printing step S40 or the second printing step S70 is performed than the position of the workpiece W when the curing step S81 is performed. In this manner, a degree of freedom in the postures of the workpiece W and the head 5a in the first printing step S40 or the second printing step S70 can be increased.

From the same viewpoint, as described above, in a plan view of the base 2, it is preferable that the position of the workpiece W when the first printing step S40 or the second printing step S70 is performed is closer to the virtual line segment LV than the position of the workpiece W when the maintenance step S82 is performed. In this case, the degree of freedom in the postures of the workpiece W and the head 5a in the first printing step S40 or the second printing step S70 can also be increased.

In addition, in the three-dimensional object printing apparatus 1, as described above, the workpiece movement distance DW is shorter than the head movement distance DH. In a plan view of the base 2, the workpiece movement distance DW is a distance between the workpiece W when the first printing step S40 or the second printing step S70 is performed and the workpiece W when the curing step S81 is performed. In a plan view of the base 2, the head movement distance DH is a distance between the head 5a when the first printing step S40 or the second printing step S70 is performed and the head 5a when the maintenance step S82 is performed.

The workpiece movement distance DW is shortened than the head movement distance DH in this way. Accordingly, the process can quickly proceed to the curing step S81 from the first printing step S40 or the second printing step S70 without increasing a movement speed of the workpiece W. As a result, both image quality and productivity can be achieved. In addition, the movement speed of the workpiece W may not need to be increased. Accordingly, even when the workpiece W is supported in the second robot 4 by the hand mechanism 40, it is possible to prevent the workpiece W from being separated or misaligned from the second robot 4. The head 5a is fixed to the first robot 3 by screwing. Accordingly, there is no problem even when the movement speed of the head 5a is increased. Therefore, even when the head movement distance DH is long, the process can quickly proceed to the maintenance step S82 from the first printing step S40 or the second printing step S70 by increasing the movement speed of the head 5a.

In addition, as described above, in a plan view of the base 2, the mounting unit 9 and the maintenance unit 8 are located on the same side with respect to the virtual line segment LV. That is, the mounting unit 9 and the maintenance unit 8 are disposed in one region of the two regions divided by the virtual line segment LV in a plan view of the base 2. Therefore, the apparatus can easily be miniaturized as a whole, compared to a configuration in which the mounting unit 9 and the maintenance unit 8 are located on sides opposite to each other with respect to the virtual line segment LV in a plan view of the base 2.

In addition, as described above, the three-dimensional object printing apparatus 1 performs the holding step S11 in which the hand mechanism 40 receives the workpiece W supplied from the mounting unit 9. Here, in a plan view of the base 2, the position of the workpiece W when the first printing step S40 or the second printing step S70 is performed is closer to the virtual line segment LV than the position of the workpiece W when the holding step S11 is performed. As the position of the workpiece W is closer to the virtual line segment LV, a degree of freedom of the operations of the first robot 3 and the second robot 4 is increased when the first printing step S40 or the second printing step S70 is performed. Therefore, the position of the workpiece W is brought closer to the virtual line segment LV when the first printing step S40 or the second printing step S70 is performed than when the holding step S11 is performed. In this manner, a degree of freedom in the postures of the workpiece W and the head 5a in the first printing step S40 or the second printing step S70 can be increased. As described above, the holding step S11 is included in the material feeding step S10.

In addition, in the three-dimensional object printing apparatus 1, as described above, in a plan view of the base 2, each of the curing unit 10 and the maintenance unit 8 is located between the first straight line LS1 passing through the base portion 310 of the first robot 3 and perpendicular to the virtual line segment LV and the second straight line LS2 passing through the base portion 410 of the second robot 4 and perpendicular to the virtual line segment LV. Therefore, the three-dimensional object printing apparatus 1 can be miniaturized as a whole.

2. Second Embodiment

Hereinafter, a second embodiment of the present disclosure will be described. In the embodiment to be described below as an example, the reference numerals used in describing the first embodiment will be assigned to elements whose operations and functions are the same as those of the first embodiment, and detailed description of each element will appropriately be omitted.

Figure 14:
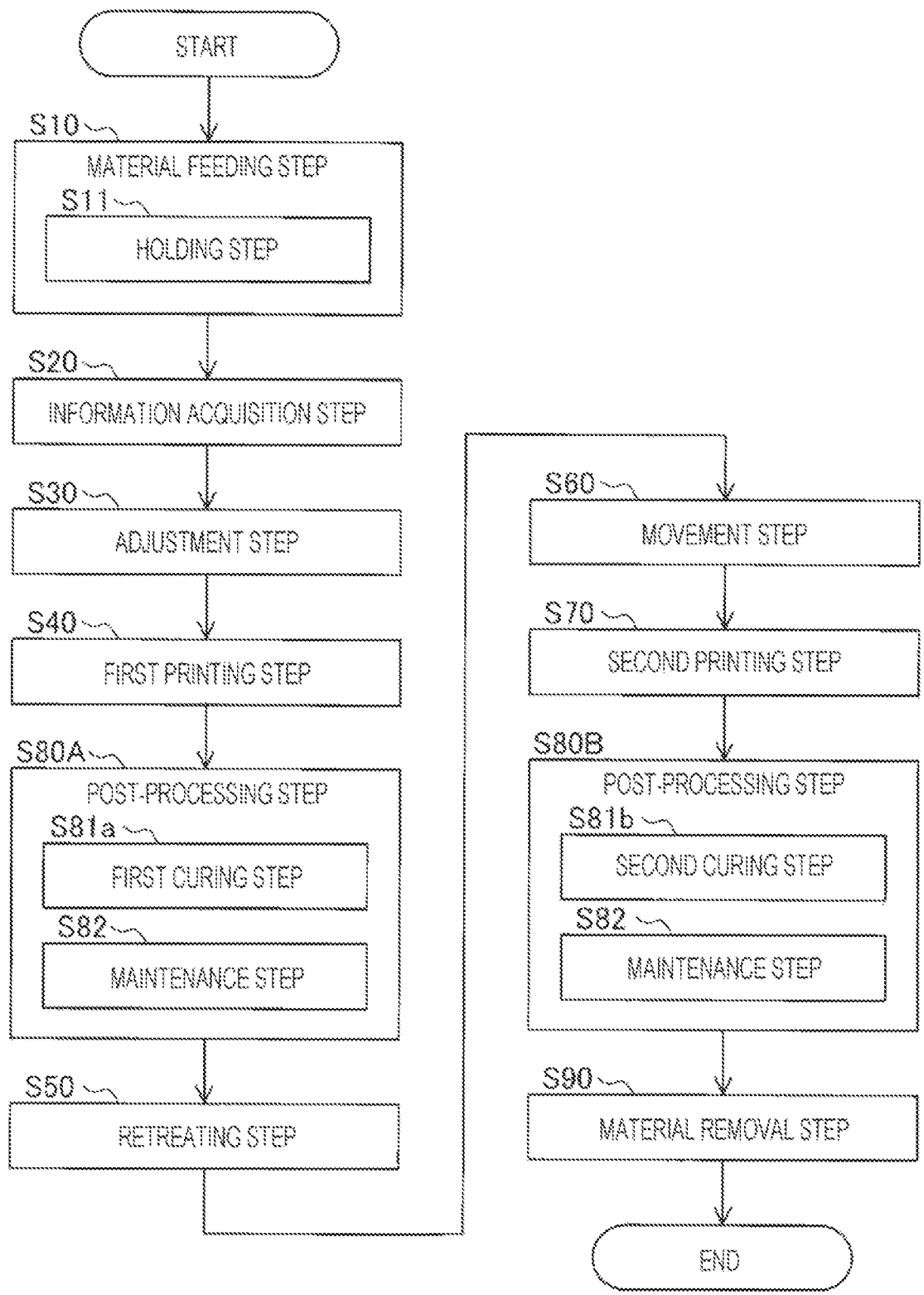
FIG. 14 is a flowchart illustrating an operation flow of a three-dimensional object printing apparatus according to a second embodiment.

FIG. 14 is a flowchart illustrating an operation flow of the three-dimensional object printing apparatus 1 according to the second embodiment. The present embodiment is the same as the above-described first embodiment except that the performance order of the first curing step S81a, the second curing step S81b, and the maintenance step S82 is different.

In the present embodiment, a post-processing step S80A including the first curing step S81a and the maintenance step S82 is performed between the first printing step S40 and the retreating step S50. In addition, a post-processing step S80B including the second curing step S81b and the maintenance step S82 is performed between the second printing step S70 and the material removal step S90. A portion of the retreating step S50 may also serve as the post-processing step S80A, or the retreating step S50 may be omitted.

In the above-described second embodiment, as in the above-described first embodiment, even when the workpiece W has various three-dimensional shapes, printing can also suitably be performed on the workpiece W. In the present embodiment, the three-dimensional object printing apparatus 1 performs the first printing step S40, the first curing step S81a, the second printing step S70, and the second curing step S81b in this order. Therefore, the first printing step S40 and the first curing step S81a can consecutively be performed. As a result, the ink discharged to the workpiece W in the first printing step S40 can immediately be cured in the first curing step S81a. Accordingly, image blurring caused by the ink flowing on the workpiece W can be reduced. Similarly, the second printing step S70 and the second curing step S81b can consecutively be performed. As a result, the ink discharged to the workpiece W in the second printing step S70 can immediately be cured in the second curing step S81b. Accordingly, image blurring caused by the ink flowing on the workpiece W can be reduced.

3. Modification Examples

Each form in the above-described examples can be modified in various ways. Specific modifications that can be applied to each of the above-described forms will be described below as examples. Two or more aspects selected from the following examples in any desired way can appropriately be combined with each other within a range in which the aspects do not contradict each other.

3-1. Modification Example 1

Figure 15:
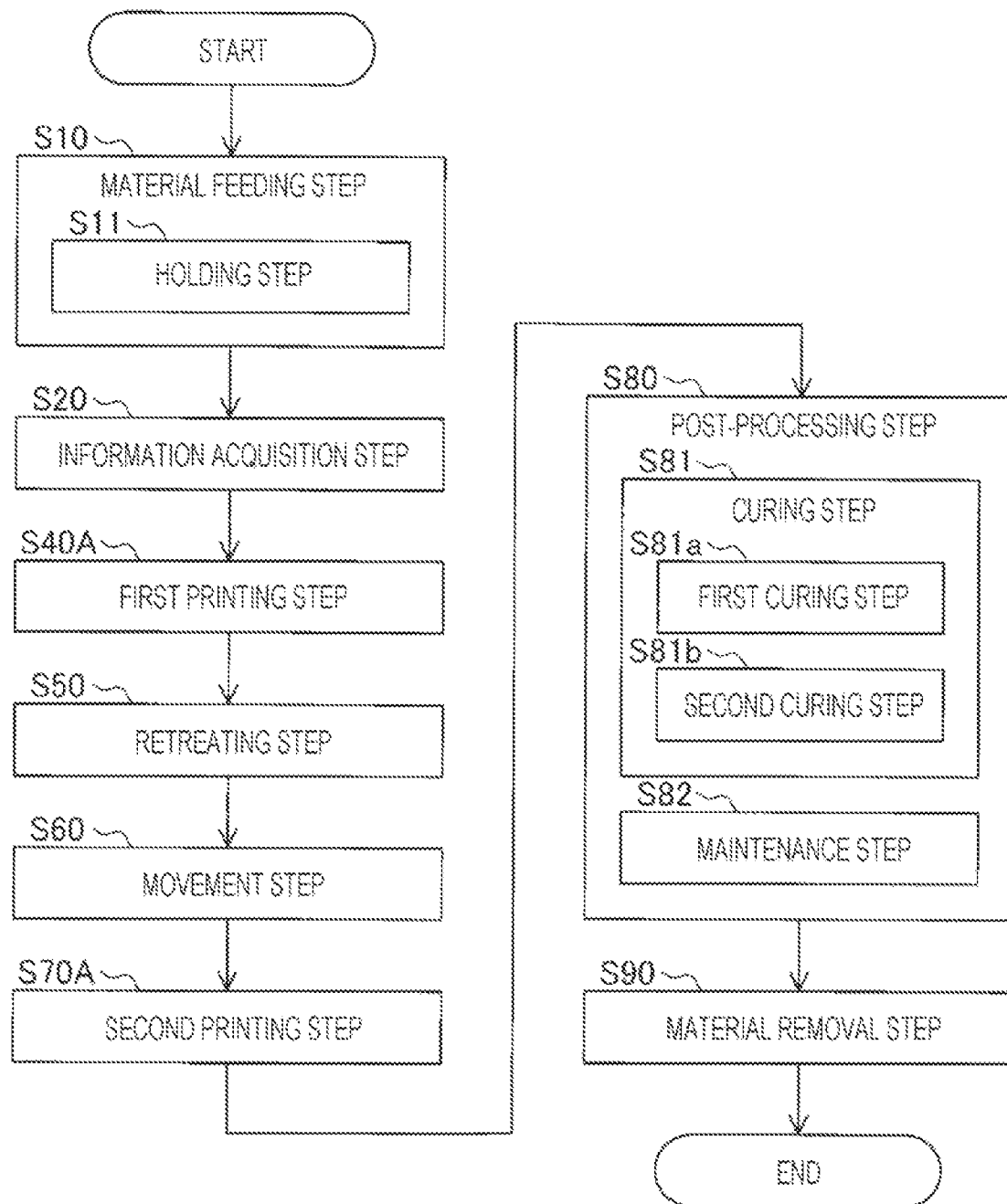
FIG. 15 is a flowchart illustrating an operation flow of a three-dimensional object printing apparatus according to Modification Example 1.

FIG. 15 is a flowchart illustrating an operation flow of the three-dimensional object printing apparatus 1 according to Modification Example 1. Modification Example 1 is the same as the above-described first embodiment except that the adjustment step S30 is omitted and a first printing step S40A and a second printing step S70A are performed instead of the first printing step S40 and the second printing step S70.

In each of the first printing step S40 and the second printing step S70, a route for the first robot 3 to move the head 5a is adjusted, based on the information acquired in the information acquisition step S20. Therefore, even when the support position of the workpiece W supported by the second robot 4 deviates from a desired position, an error occurring in a relationship of the relative positions and postures of the head 5a and the workpiece W can be reduced by adjustment. In Modification Example 1 described above, as in the above-described first embodiment, even when the workpiece W has various three-dimensional shapes, printing can suitably be performed on the workpiece W.

3-2. Modification Example 2

Figure 16:
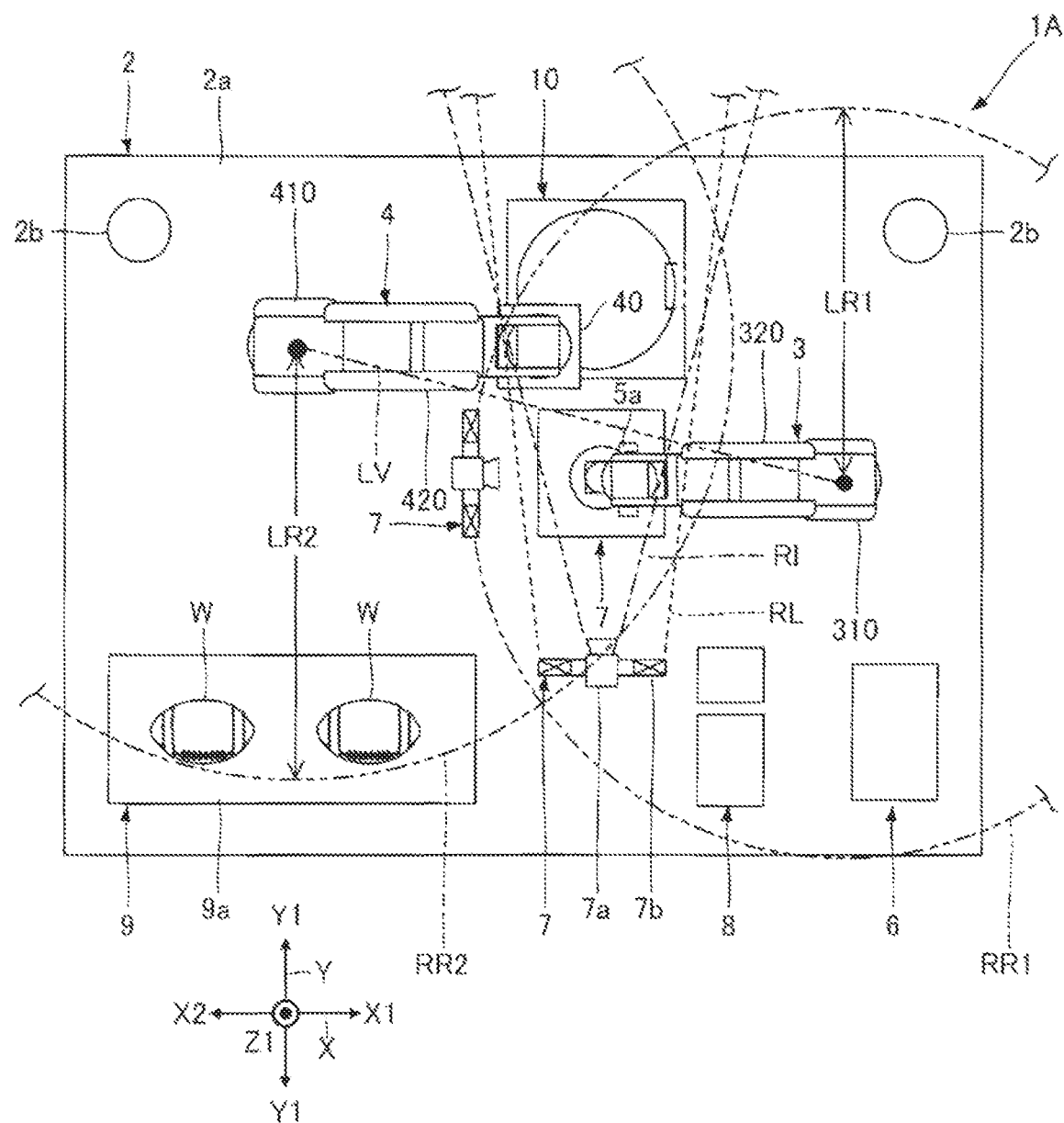
FIG. 16 is a plan view of the three-dimensional object printing apparatus according to Modification Example 1.

FIG. 16 is a plan view of a three-dimensional object printing apparatus 1A according to Modification Example 2. The three-dimensional object printing apparatus 1A is the same as the three-dimensional object printing apparatus 1 of the above-described first embodiment except that the number of the imaging units 7 is three. Specifically, in addition to the imaging unit 7 that captures the image in the Y1-direction as in the first embodiment, the three-dimensional object printing apparatus 1A has the imaging unit 7 that captures the image in the Z1-direction and the imaging unit 7 that captures the image in the X1-direction.

In Modification Example 2 described above, as in the above-described first embodiment, even when the workpiece W has various three-dimensional shapes, printing can suitably be performed on the workpiece W. In Modification Example 2, the number of the imaging units 7 is larger than that in the first embodiment. Accordingly, there is an advantage in that detection accuracy of the position and the posture of the workpiece W based on the imaging result of the imaging unit 7 can easily be improved. Here, it is preferable that the workpiece W during the printing is located inside the region where the imaging ranges of the imaging devices 7a of the imaging unit 7 overlap.

3-3. Modification Example 3

In the above-described form, a configuration in which a vertical multi-axis robot having 6 axes is used as a movement mechanism has been described as an example. However, the present disclosure is not limited to the configuration. The movement mechanism may be capable of three-dimensionally changing the relative position and posture of the liquid discharge head with respect to the workpiece. Therefore, for example, the movement mechanism may be a vertical multi-axis robot having axes other than the 6 axes, or may be a horizontal multi-axis robot. In addition, the robot arm may have an expansion/contraction mechanism in addition to the joint portions configured to include the pivoting mechanism. However, from a viewpoint of the balance between printing quality during a printing operation and a degree of freedom in an operation of the movement mechanism during a non-printing operation, it is preferable that the movement mechanism is a multi-axis robot having 6 or more axes. In addition, a dual-arm robot may be used. In this case, one arm can be used as the first robot, and the other arm can be used as the second robot.

3-4. Modification Example 4

In the above-described form, a configuration in which the screwing is used as a method of fixing the head to the first robot has been described as an example. However, the present disclosure is not limited to the configuration. For example, the head may be fixed to the first robot in such a manner that the head is gripped by a gripping mechanism such as a hand mounted as an end effector of the first robot.

3-5. Modification Example 5

In the above-described form, a configuration in which printing is performed by using one type of the ink has been described as an example. However, the present disclosure is not limited to this configuration, and the present disclosure is applicable to a configuration in which printing is performed by using two or more types of the ink.

3-6. Modification Example 6

An applicable field of the three-dimensional object printing apparatus of the present disclosure is not limited to the printing. For example, a three-dimensional object printing apparatus that discharges a solution of a coloring material is used as a manufacturing apparatus for forming a color filter of a liquid crystal display device. In addition, a three-dimensional object printing apparatus that discharges a solution of a conductive material is used as a manufacturing apparatus for forming wirings or electrodes on a wiring substrate. In addition, a three-dimensional object printing apparatus can also be used as a jet dispenser for applying a liquid such as an adhesive to the workpiece.

What is claimed is:

1. A three-dimensional object printing apparatus comprising:
   an imaging device fixed to a base and imaging an object located at an inside of an imaging range;
   a first articulated robot supporting a head having a nozzle for discharging a liquid and changing a position and a posture of the head;
   a second articulated robot supporting a workpiece and changing a position and a posture of the workpiece;
   a memory configured to store a program; and
   a processor configured to execute the program so as to:
      control the second articulated robot to move the workpiece from an outside of the imaging range to the inside of the imaging range as a material feeding step; and
      control at least one of the first articulated robot and the second articulated robot to relatively move the head and the workpiece at the inside of the imaging range as a printing step in which the head discharges the liquid to the workpiece.

2. The three-dimensional object printing apparatus according to claim 1, wherein
   the second articulated robot has a hand mechanism for holding the workpiece to be attachable and detachable.

3. The three-dimensional object printing apparatus according to claim 2, further comprising:
   a mounting base disposed at the outside of the imaging range and on which the workpiece is mountable, wherein
   the hand mechanism receives the workpiece supplied from the mounting base.

4. The three-dimensional object printing apparatus according to claim 1, wherein
   the processor is further configured to:
      cause the imaging device to capture an image of the imaging range to generate an imaging result; and
      acquire information relating to a relative position of the workpiece with respect to the base based on the imaging result of the imaging device as an information acquisition step, and
   the processor is configured to perform the information acquisition step between the material feeding step and the printing step.

5. The three-dimensional object printing apparatus according to claim 4, wherein
   in the information acquisition step, the head is located at the outside of the imaging range.

6. The three-dimensional object printing apparatus according to claim 4, further comprising:
   a maintenance mechanism covering the nozzle, wherein
   the maintenance mechanism is located at the outside of the imaging range, and
   in the information acquisition step, the nozzle is covered by the maintenance mechanism.

7. The three-dimensional object printing apparatus according to claim 6, wherein
   the maintenance mechanism is located at an inside of an operation range of the first articulated robot, and is located at an outside an operation range of the second articulated robot.

8. The three-dimensional object printing apparatus according to claim 4, wherein
   in the printing step, a route for the first articulated robot to move the head is adjusted, based on the information acquired in the information acquisition step.

9. The three-dimensional object printing apparatus according to claim 4, wherein
   the processor is further configured to adjust the position of the workpiece located at the inside of the imaging range as an adjustment step that is performed between the information acquisition step and the printing step, and in the adjustment step, an operation of the second articulated robot is controlled, based on the information acquired in the information acquisition step.

10. The three-dimensional object printing apparatus according to claim 4, further comprising:

an illumination source that illuminates the inside of the imaging range, wherein in the information acquisition step, the illumination source is turned on, and in the printing step, the illumination source is turned off.

11. The three-dimensional object printing apparatus according to claim 10, further comprising:

a maintenance mechanism covering the nozzle, wherein the maintenance mechanism is located at an outside of an illumination range of the illumination source.

12. The three-dimensional object printing apparatus according to claim 10, wherein the head has a nozzle surface on which the nozzle is provided, and the nozzle surface is located at an outside of an illumination range of the illumination source or faces a direction that is shaded by light emitted from the illumination source, when the illumination source is turned on.

13. The three-dimensional object printing apparatus according to claim 4, wherein a color of at least a portion of the first articulated robot, which is located at the inside of the imaging range in the information acquisition step, is different from a color of the workpiece.

14. The three-dimensional object printing apparatus according to claim 4, wherein a color of at least a portion of the second articulated robot, which is located at the inside of the imaging range in the information acquisition step, is different from a color of the workpiece.

15. The three-dimensional object printing apparatus according to claim 1, wherein the first articulated robot has a first base portion fixed to the base, the second articulated robot has a second base portion fixed to the base, and in a plan view of the base, a virtual line segment connecting the first base portion and the second base portion passes through the imaging range.

16. The three-dimensional object printing apparatus according to claim 1, wherein the liquid discharged from the head has a photocurable property.

17. A three-dimensional object printing apparatus comprising:

an imaging device fixed to a base and imaging an object located at an inside of an imaging range;

a first articulated robot supporting a head having a nozzle for discharging a liquid and changing a position and a posture of the head;

a second articulated robot supporting a workpiece and changing a position and a posture of the workpiece;

a memory configured to store a program; and a processor configured to execute the program so as to:

control the second articulated robot to move the workpiece from an outside of the imaging range to the inside of the imaging range as a material feeding step;

control at least one of the first articulated robot and the second articulated robot to relatively move the head and the workpiece at the inside of the imaging range as a printing step in which the head discharges the liquid to the workpiece;

cause the imaging device to capture an image of the imaging range to generate an imaging result;

acquire information relating to a relative position of the workpiece with respect to the base based on the imaging result of the imaging device as an information acquisition step that is performed between the material feeding step and the printing step; and control the first articulated robot to move the head to the outside of the imaging range in the information acquisition step.

18. A three-dimensional object printing apparatus comprising:

an imaging device fixed to a base and imaging an object located at an inside of an imaging range;

a first articulated robot supporting a head having a nozzle for discharging a liquid and changing a position and a posture of the head;

a second articulated robot supporting a workpiece and changing a position and a posture of the workpiece;

a maintenance mechanism covering the nozzle;

a memory configured to store a program; and a processor configured to execute the program so as to:

control the second articulated robot to move the workpiece from an outside of the imaging range to the inside of the imaging range as a material feeding step;

control at least one of the first articulated robot and the second articulated robot to relatively move the head and the workpiece at the inside of the imaging range as a printing step in which the head discharges the liquid to the workpiece;

cause the imaging device to capture an image of the imaging range to generate an imaging result; and acquire information relating to a relative position of the workpiece with respect to the base based on the imaging result of the imaging device as an information acquisition step that is performed between the material feeding step and the printing step, wherein the maintenance mechanism is located at the outside of the imaging range, and in the information acquisition step, the nozzle is covered by the maintenance mechanism.

* * * * *